United States Patent
Hagiwara

(10) Patent No.: US 11,933,365 B2
(45) Date of Patent: Mar. 19, 2024

(54) PRODUCING METHOD OF BEARING UNIT, PRODUCING METHOD OF MACHINE, AND PRODUCING METHOD OF VEHICLE

(71) Applicant: NSK LTD., Tokyo (JP)

(72) Inventor: Nobuyuki Hagiwara, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/036,311

(22) PCT Filed: Aug. 16, 2021

(86) PCT No.: PCT/JP2021/029908
§ 371 (c)(1),
(2) Date: May 10, 2023

(87) PCT Pub. No.: WO2022/130687
PCT Pub. Date: Jun. 23, 2022

(65) Prior Publication Data
US 2023/0400065 A1  Dec. 14, 2023

(30) Foreign Application Priority Data

Dec. 18, 2020 (JP) ................... 2020-209855

(51) Int. Cl.
*F16C 43/04* (2006.01)
*B21D 53/10* (2006.01)
*B21D 53/26* (2006.01)
*B60B 27/00* (2006.01)

(52) U.S. Cl.
CPC .............. *F16C 43/04* (2013.01); *B21D 53/10* (2013.01); *B21D 53/265* (2013.01); *B60B 27/0078* (2013.01)

(58) Field of Classification Search
CPC ....................................... F16C 43/04
See application file for complete search history.

(56) References Cited

U.S. PATENT DOCUMENTS

2016/0274561 A1  9/2016  Stone

FOREIGN PATENT DOCUMENTS

| CA | 3 131 504 A1 | 9/2020 |
|---|---|---|
| JP | 11-44319 A | 2/1999 |
| JP | 11-044319 A | 2/1999 |
| JP | 2010-66189 A | 3/2010 |
| JP | 2010-066189 A | 3/2010 |
| JP | 2019-116917 A | 7/2019 |

(Continued)

OTHER PUBLICATIONS

WO-2020208947-A1 English translation (Year: 2020).*

(Continued)

*Primary Examiner* — Jason L Vaughan
*Assistant Examiner* — Amanda Kreiling
(74) *Attorney, Agent, or Firm* — Sughrue Mion, PLLC

(57) ABSTRACT

A producing method of a bearing unit includes: a step of measuring torque of a first bearing unit under each of a plurality of load conditions during production of the first bearing unit; a step of determining a target value of each of a plurality of production parameters based on of a load-torque relationship obtained from measurement results of the torque; and a step of producing a second bearing unit on the basis of the target value of each of the plurality of production parameters.

5 Claims, 10 Drawing Sheets

(56) References Cited

FOREIGN PATENT DOCUMENTS

WO         2020/208947 A1    10/2020
WO    WO-2020208947 A1 * 10/2020  ............. B21J 9/025

OTHER PUBLICATIONS

European Search Report for 21 84 4171 dated Jul. 26, 2022.
International Search Report for PCT/JP2021/029908 dated Oct. 12, 2021 (PCT/ISA/210).
European Search Report for 21 84 4171 dated Jul. 14, 2022.

\* cited by examiner (OTHER SIDE IN AXIAL DIRECTION)
OUTER SIDE IN AXIAL DIRECTION
←

(ONE SIDE IN AXIAL DIRECTION)
INNER SIDE IN AXIAL DIRECTION
→

(a) DISTRIBUTION OF CONTROL FACTORS A (b) DISTRIBUTION OF CONTROL FACTORS B (c) DISTRIBUTION OF CONTROL FACTORS C

200 ved at the time of production of the bearing unit is to improve the
PRODUCING METHOD OF BEARING UNIT, PRODUCING METHOD OF MACHINE, AND PRODUCING METHOD OF VEHICLE The present invention relates to a producing method of a bearing unit, a producing method of a machine, and a producing method of a vehicle.

This application is a National Stage of International Application No. PCT/JP2021/029908 filed Aug. 16, 2021, claiming priority based on Japanese Patent Application No. 2020-209855, filed Dec. 18, 2020, the content of which is incorporated herein by reference.

TECHNICAL FIELD

The present invention relates to a producing method of a bearing unit, a producing method of a machine, and a producing method of a vehicle.

Priority is claimed on Japanese Patent Application No. 2020-209855, filed Dec. 18, 2020, the content of which is incorporated herein by reference.

BACKGROUND ART

One type (index) of quality control of a bearing unit is torque control of a bearing unit. Torque of a bearing unit is torque for relatively rotating a stationary ring and a rotating ring constituting the bearing unit. The torque of this bearing unit includes starting torque which is torque for starting relative rotation between a stationary ring and a rotating ring and rotational torque which is torque for continuing the relative rotation between the stationary ring and the rotating ring. From a viewpoint of high efficiency and low fuel consumption of an automobile or a machine, the bearing unit is required to have low torque (low friction).

In the related art, various techniques for measuring torque of a bearing unit at the time of production of the bearing unit in order to control quality of the bearing unit are known. For example, Japanese Patent Application, Publication No. H11-44319 (Patent Literature 1) describes a technique for measuring rotational torque of a bearing unit while a staking portion for coupling and fixing a hub ring and an inner ring constituting a hub which is a rotating ring is formed in a process of assembling the bearing unit. Further, Japanese Patent Application, Publication No. 2010-66189 (Patent Literature 2) describes a technique for measuring starting torque or rotational torque of a bearing unit in an inspection process after assembling the bearing unit.

CITATION LIST

Patent Literature

[Patent Literature 1]
Japanese Patent Application, Publication No. H11-44319
[Patent Literature 2]
Japanese Patent Application, Publication No. 2010-66189

SUMMARY OF INVENTION

Technical Problem

Incidentally, in quality engineering, factors that deteriorate a function of a product are called noise, and in particular, noise from the outside of a product is called a disturbance. In the bearing unit, for example, a load acting during use becomes a disturbance for a function in low torque. That is, the torque of the bearing unit increases with the load acting during use, and the amount of increase changes depending on a direction or magnitude of the acting load. It is preferable that such a bearing unit be a bearing unit that not only has low torque in a case where a direction and a magnitude of the acting load, that is, load conditions, are constant, but also has a small change in torque due to a change in load conditions, that is, is resistant to the disturbance.

On the other hand, all of the above-mentioned techniques of the related art are merely techniques for measuring the torque of the bearing unit and determining whether or not the bearing unit meets a standard at the time of production of the bearing unit in order to control the quality of the bearing unit. That is, in the related art, using the torque measured at the time of production of the bearing unit is to improve the quality of any other bearing unit to be produced, specifically, using the torque to reduce a change in torque due to a change in load conditions, is not considered.

With respect to this, as a result of a study, the present inventor came to the conclusion that it is effective to use the torque measured at the time of production of the bearing unit to reduce a change in torque due to a change in load conditions relating to any other bearing unit to be produced.

An object of the present invention is to provide a producing method of a bearing unit, a producing method of a machine, and a producing method of a vehicle, which can reduce a change in torque due to a change in load conditions.

Solution to Problem

A producing method of a bearing unit of an aspect of the present invention includes: a step of measuring torque of a first bearing unit under each of a plurality of load conditions during production of the first bearing unit; a step of determining a target value of each of a plurality of production parameters on the basis of a load-torque relationship obtained from measurement results of the torque; and a step of producing a second bearing unit on the basis of the target value of each of the plurality of production parameters.

In one example, the measurement step includes measuring a plurality of parameter values relating to the plurality of production parameters during production of the first bearing unit, and the determination step includes setting a reference level relating to certain production parameters selected from among the plurality of production parameters on the basis of measurement results of the torque and measurement results of the plurality of parameter values, and determining a target value of each of the plurality of production parameters using the reference level.

In one example, the determination step further includes performing a regression analysis on the basis of measurement results of the torque and measurement results of the plurality of parameter values, and the certain production parameters are selected from among the plurality of production parameters on the basis of results of the regression analysis.

In one example, the determination step further includes calculating a first SN ratio based on measurement results of the torque, and the certain production parameters are selected from among the plurality of production parameters on the basis of calculation results of the first SN ratio.

In one example, the determination step further includes calculating a second SN ratio based on measurement results of the torque and measurement results of the plurality of parameter values, and setting a reference level relation to the certain production parameters using the second SN ratio.

In one example, the producing method further includes: a step of measuring torque of the second bearing unit under each of the plurality of load conditions during production of the second bearing unit based on the target value of each of the plurality of production parameters according to the reference level; a step of measuring torque of a third bearing unit under each of the plurality of load conditions during production of the third bearing unit based on a target value of each of the plurality of production parameters according to a level different from the reference level; a step of determining a revised target value of each of the plurality of production parameters on the basis of a load-torque relationship based on the production of the second bearing unit and a load-torque relationship based on the production of the third bearing unit; and a step of producing a fourth bearing unit on the basis of the revised target value of each of the plurality of production parameters.

In another aspect of the present invention, a producing method of a machine includes a step of producing the bearing unit by the producing method of a bearing unit described above.

In still another aspect of the present invention, a producing method of a vehicle includes a step of producing the bearing unit by the producing method of a bearing unit described above.

Advantageous Effects of Invention

According to the aspects of the present invention, it is possible to provide a producing method of a bearing unit, a producing method of a machine, and a producing method of a vehicle, which can reduce a change in torque due to a change in load conditions.

Figure 2:
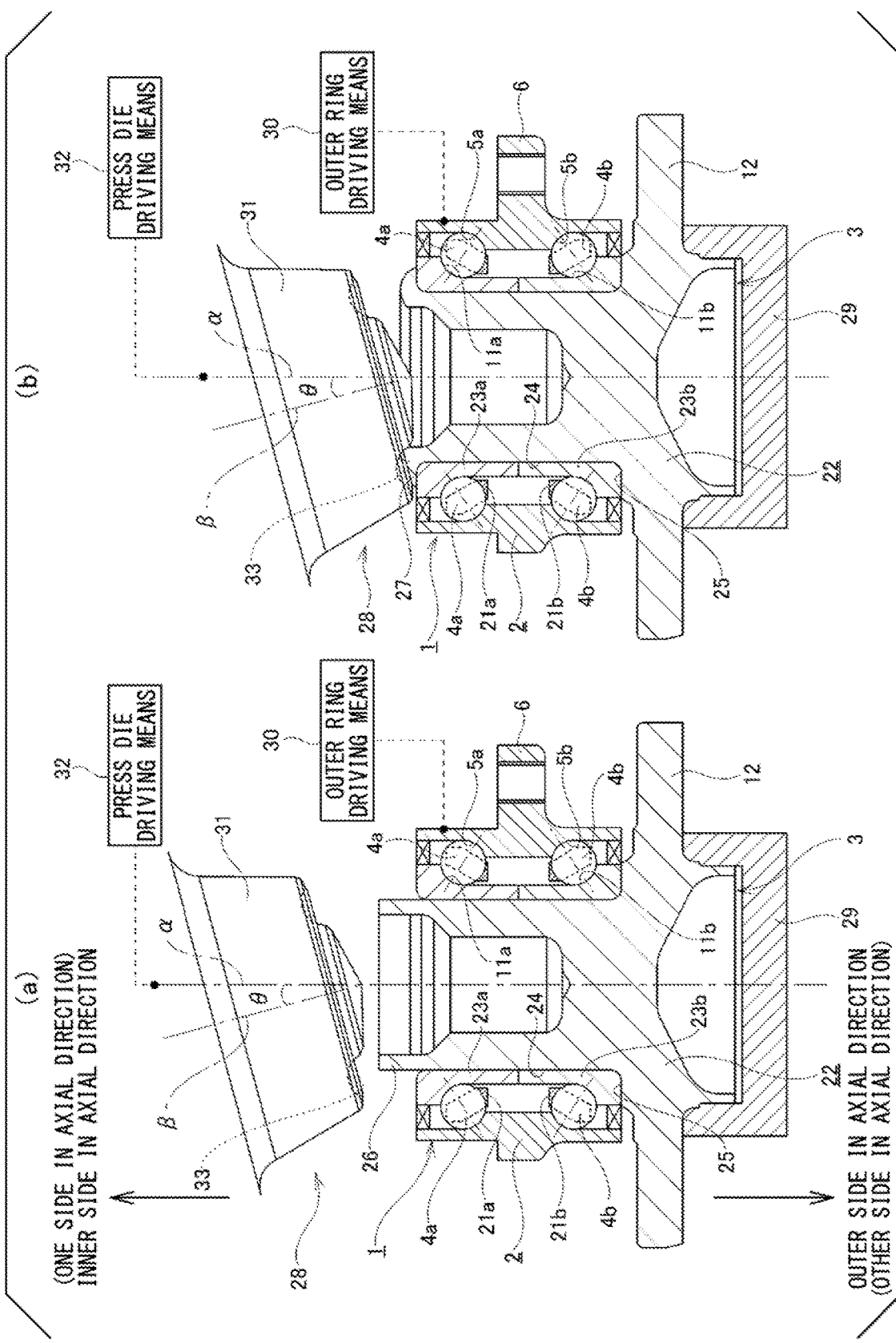

Parts (a) and (b) of FIG. 2 are cross-sectional views showing steps of forming a staking portion in order.

Figure 3:
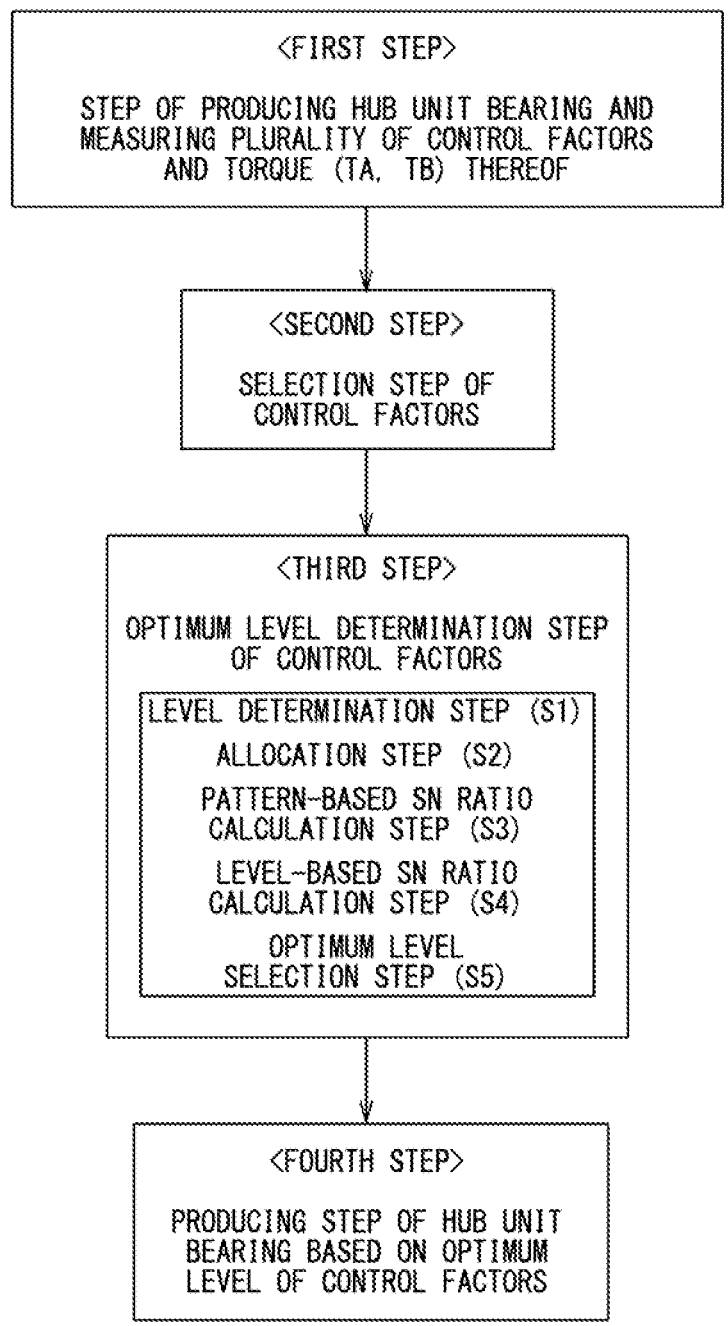

FIG. 3 is a flowchart showing a producing method of a hub unit bearing in order of steps.

Figure 4:
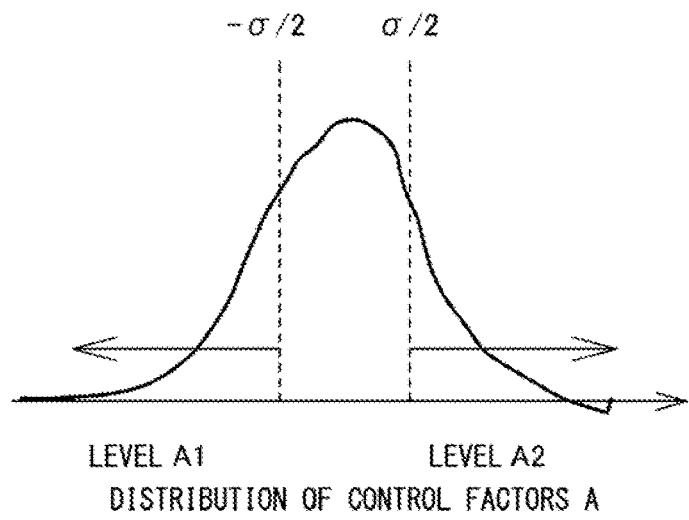
Figure 4:
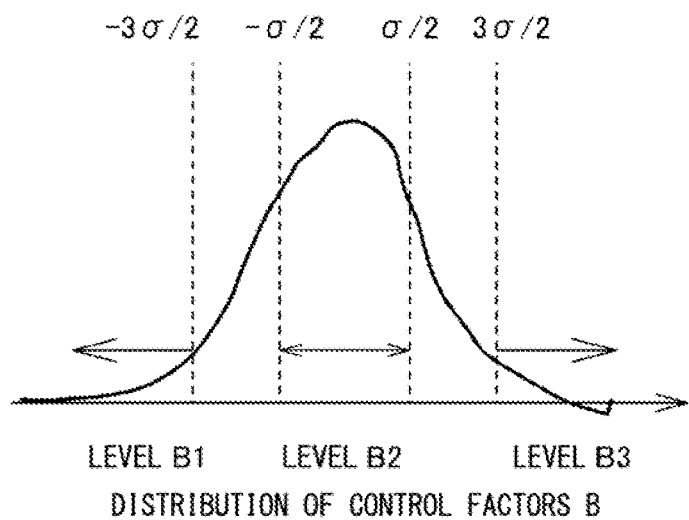
Figure 4:
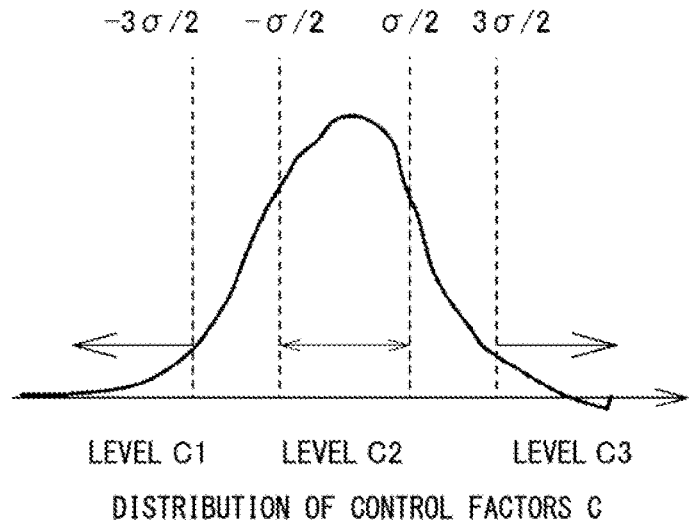

Parts (a) to (c) of FIG. 4 are graphs virtually showing distributions of values of a plurality of (three in the illustrated example) control factors measured during production of the hub unit bearing.

Figure 5:
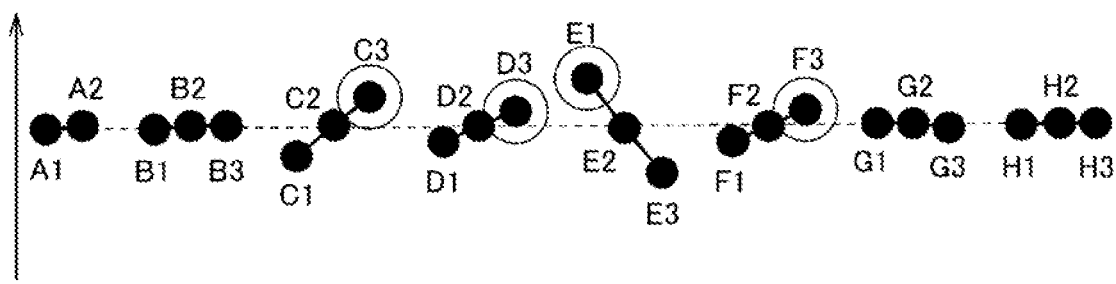

FIG. 5 is a diagram showing a virtual example of a factor-effect diagram of an SN ratio.

Figure 6:
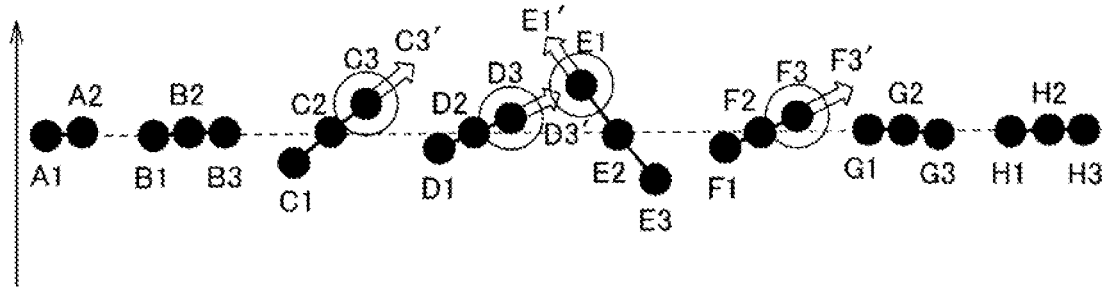

FIG. 6 is a diagram showing another virtual example of a factor-effect diagram of an SN ratio.

Figure 7:
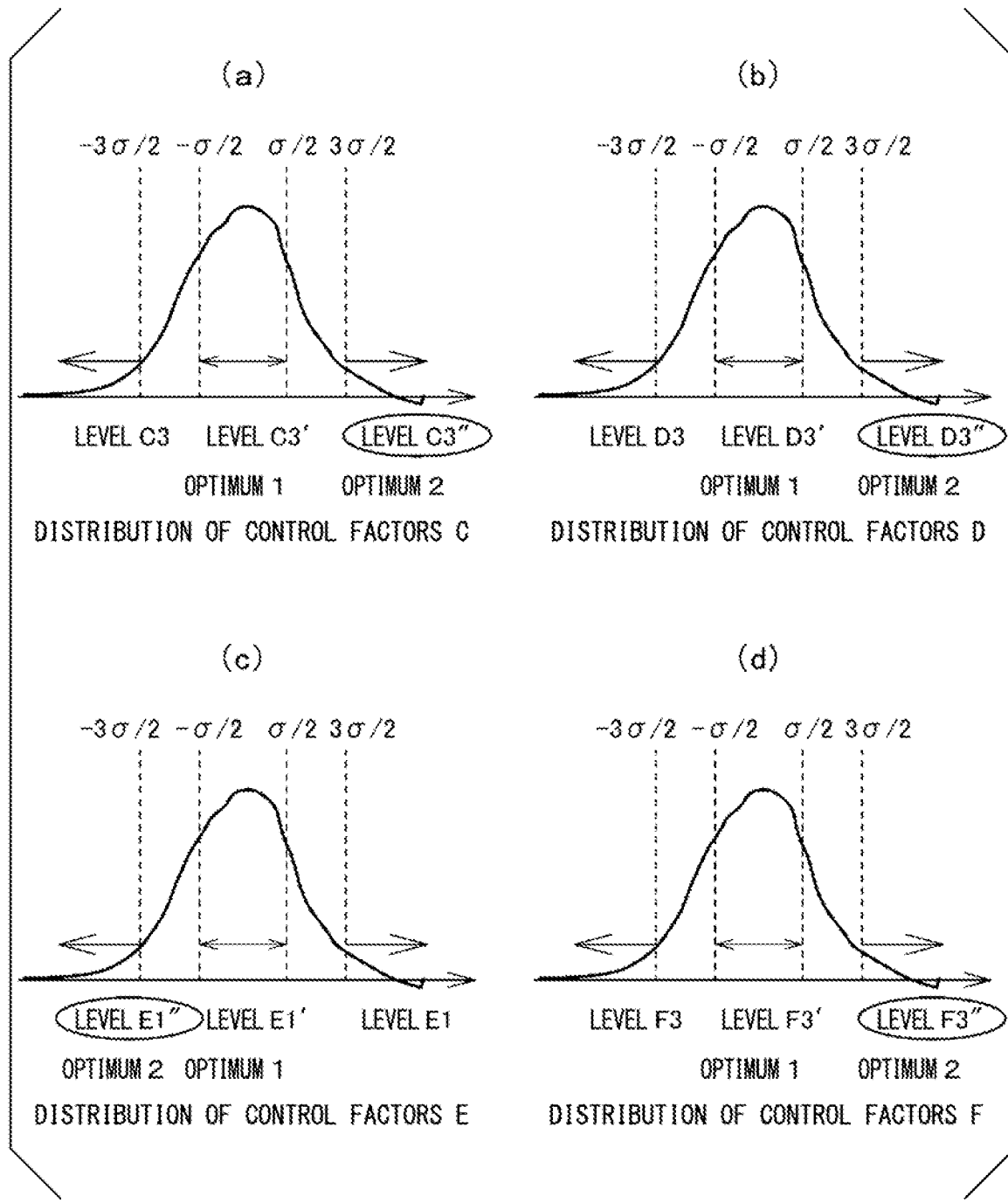

Parts (a) to (d) or FIG. 7 are graphs virtually showing distributions of values of a plurality of (four in the illustrated example) control factors obtained by a first experiment performed in order to reduce a change in torque due to a change in load conditions relating to the hub unit bearing.

Figure 8:
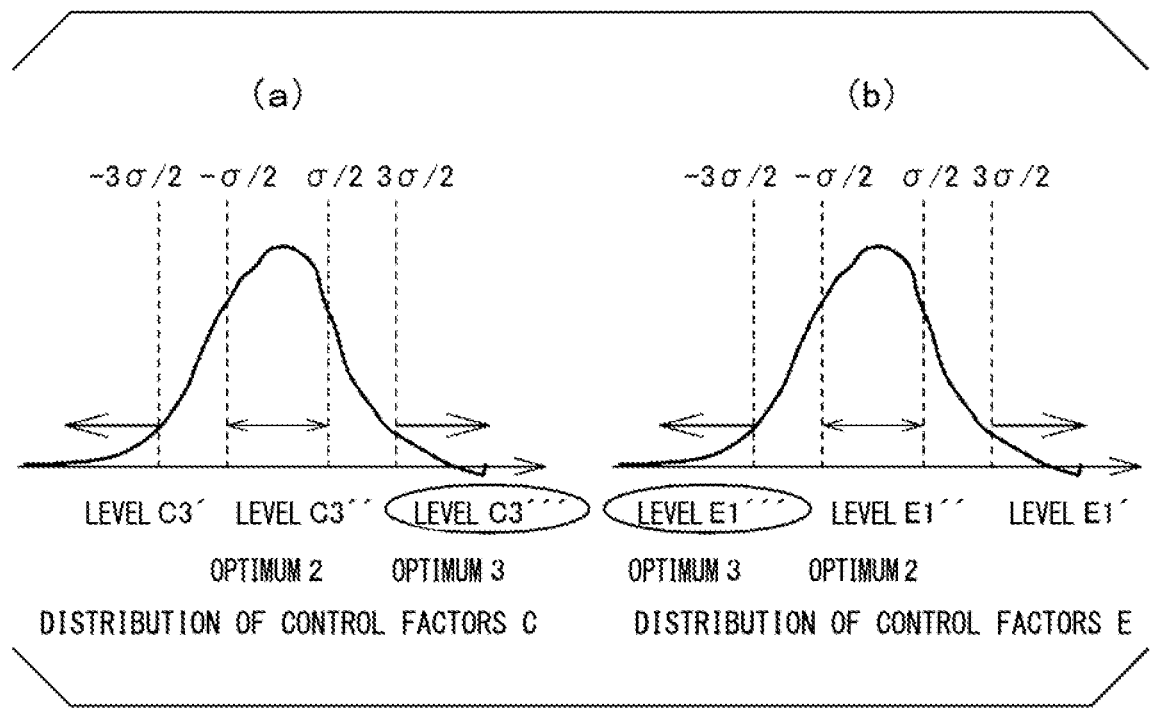

Parts (a) and (b) of FIG. 8 are graphs virtually showing distributions of values of a plurality of (two in the illustrated example) control factors obtained by a second experiment performed in order to reduce a change in torque due to a change in load conditions relating to the hub unit bearing.

Figure 9:
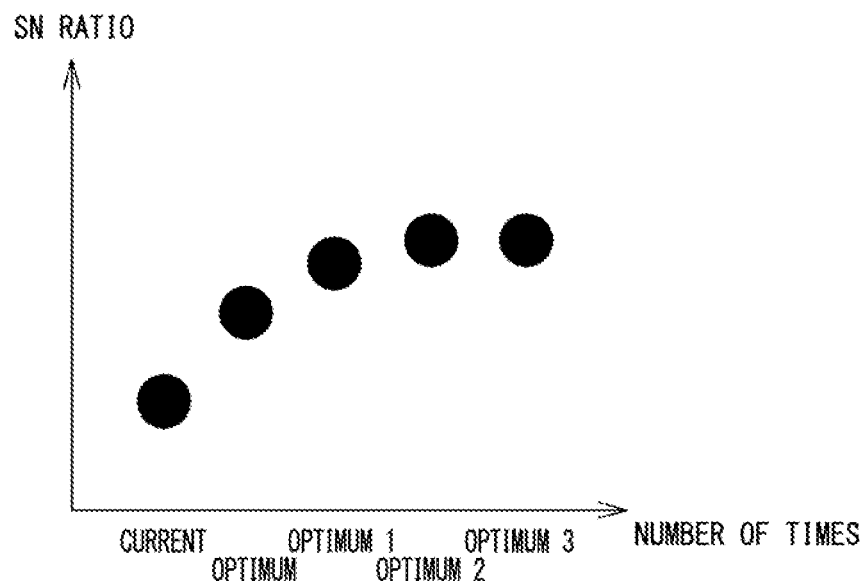

FIG. 9 is a graph virtually showing results (SN ratios) of a plurality of experiments performed in order to reduce a change in torque due to a change in load conditions relating to the hub unit bearing.

Figure 10:
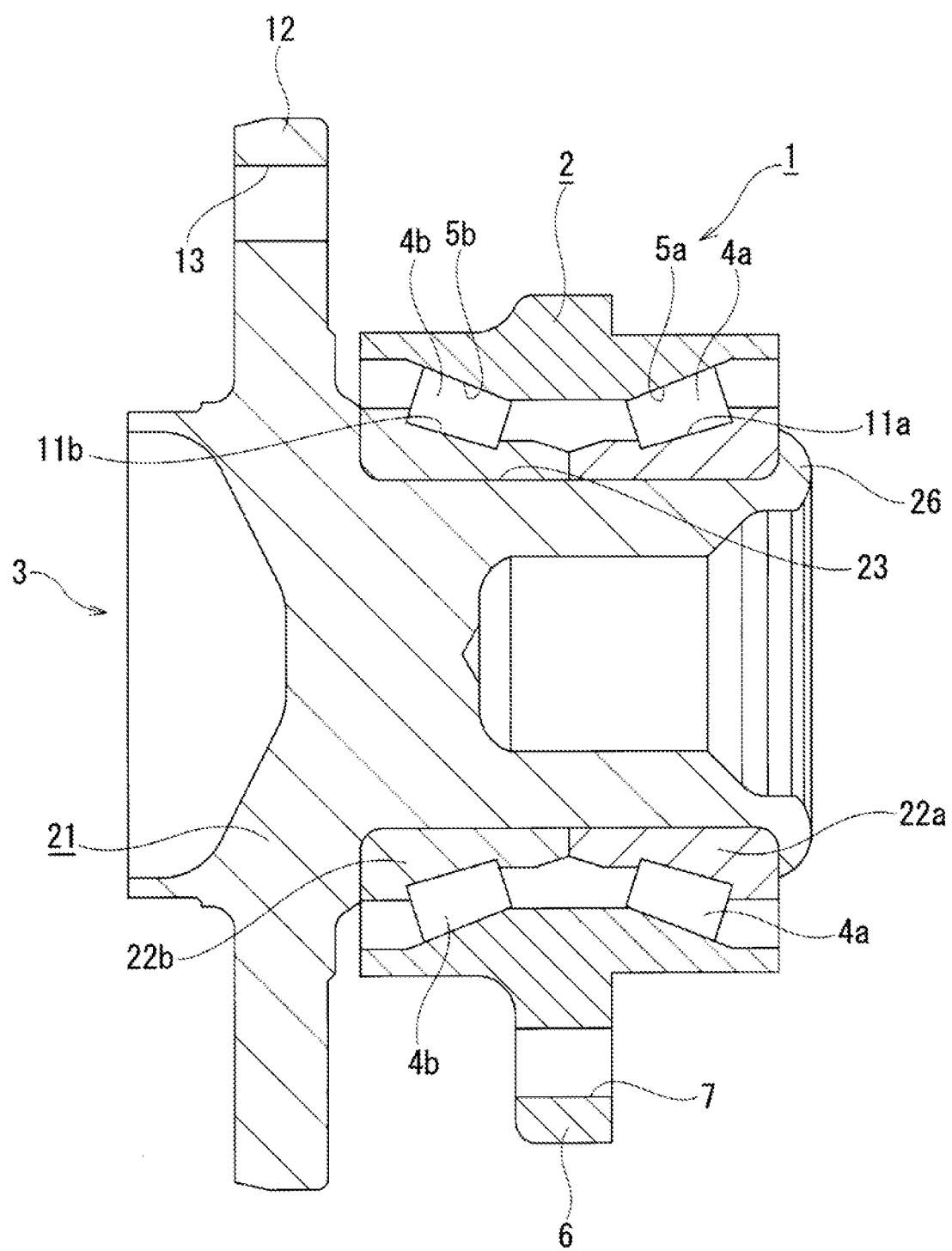

FIG. 10 is a cross-sectional view showing an example of a hub unit bearing using conical rollers.

Figure 11:
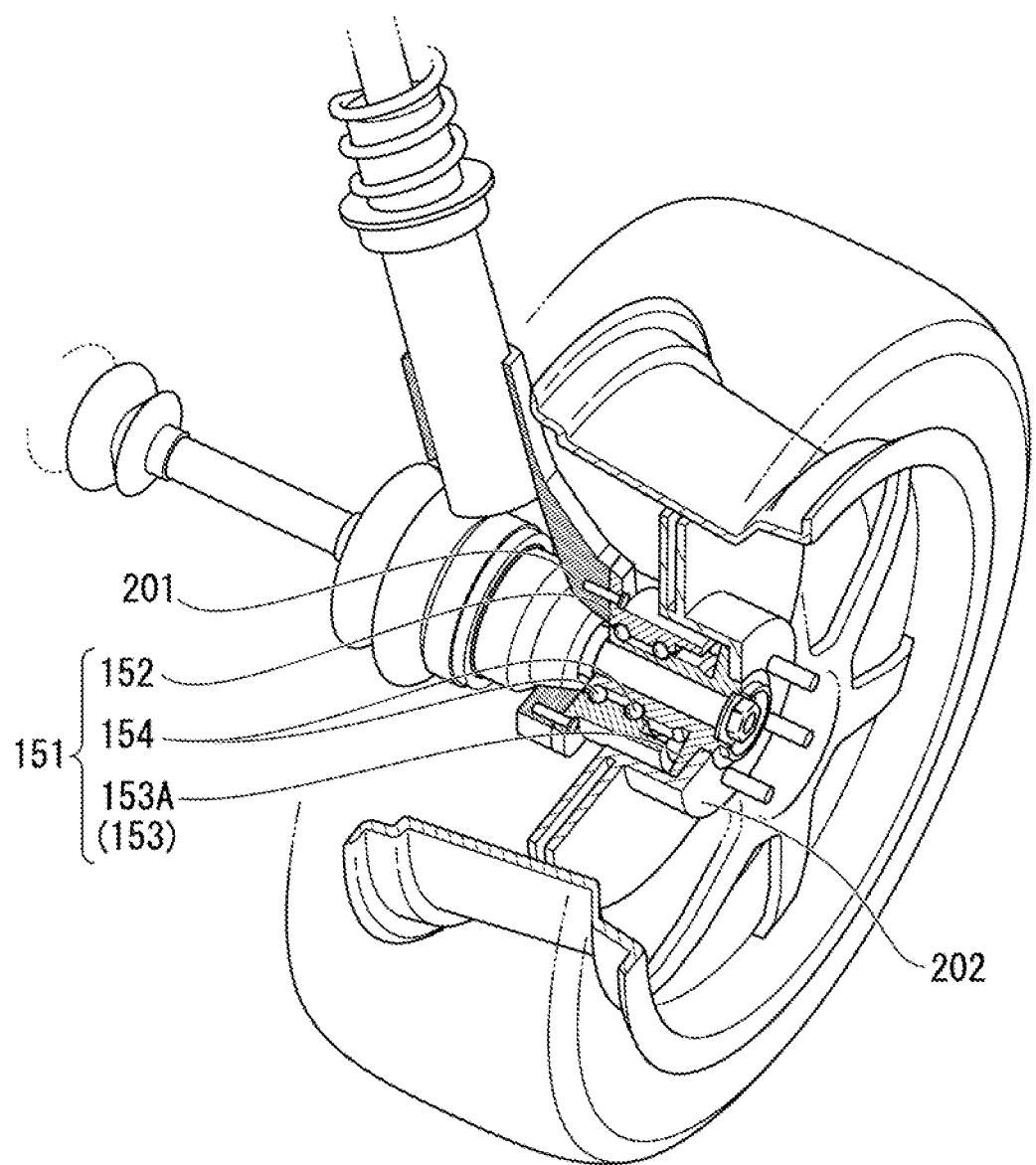

FIG. 11 is a partial schematic view of the vehicle including the hub unit bearing (the bearing unit).

Figure 12:
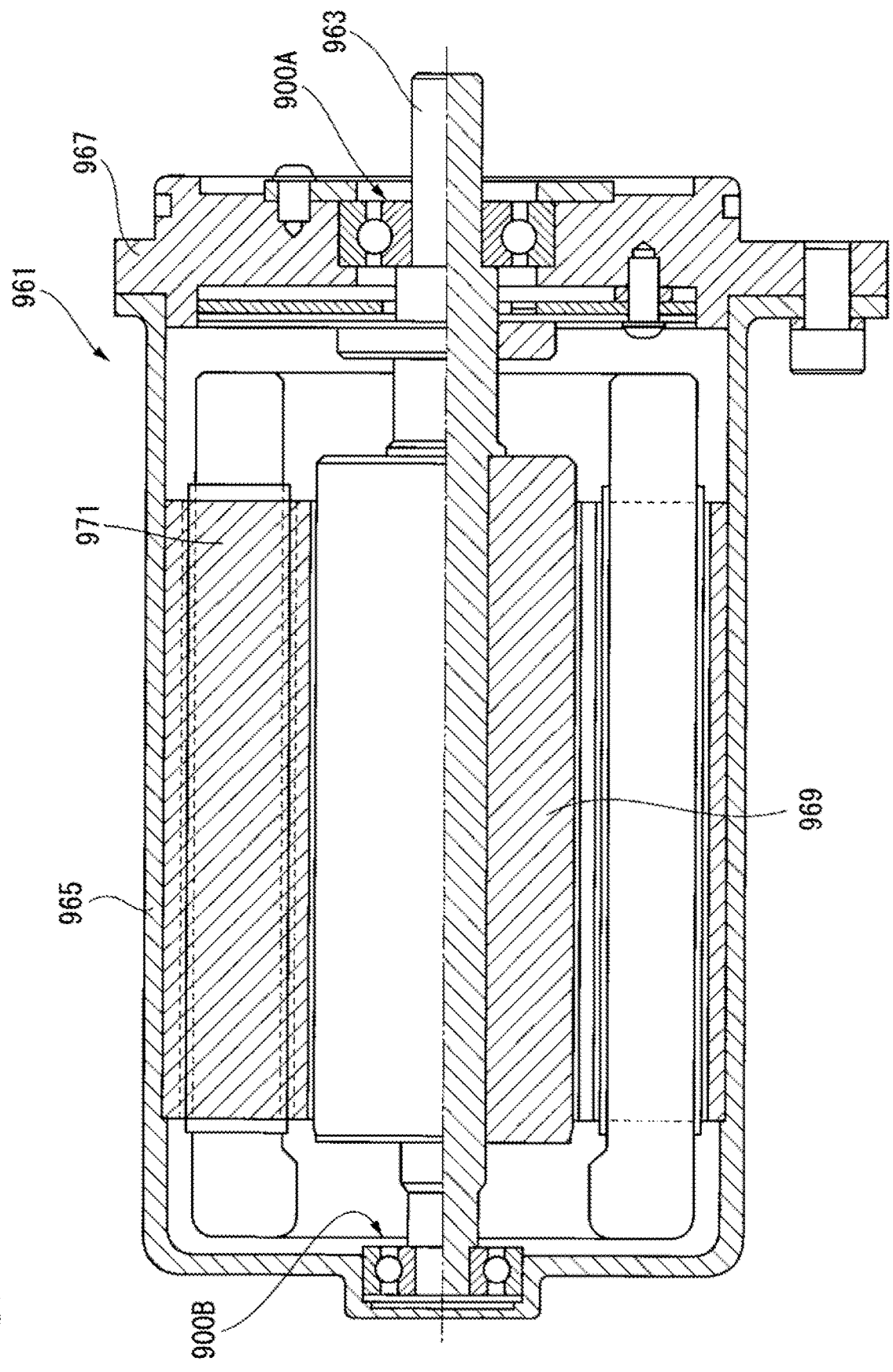

FIG. 12 is a schematic configuration view of a motor to which a bearing unit (a bearing) is applied.

DESCRIPTION OF EMBODIMENTS

First embodiment

A first embodiment of the present invention will be described with reference to FIGS. 1 to 5.

Overview

In the present embodiment, a producing method of a bearing unit is a producing method in which a change in torque due to a change in load conditions relating to a completed bearing unit is reduced by optimizing production parameters (control factors) relating to specifications and/or production conditions of a bearing unit by a method of quality engineering. The control factors are parameters (production parameters) with which the designer can freely determine a target value (a center value) or a level.

In one example, in the producing method, unlike a general producing method to which the method of quality engineering is applied, experiments for optimizing the control factors are not performed. That is, bearing units that are used only for experiments are not produced.

Hereinafter, as an application example of a bearing unit, a structure of a hub unit bearing 1 will be described, and then a producing method of a bearing unit (a hub unit bearing) will be specifically described.

Structure of Hub Unit Bearing 1

Figure 1:
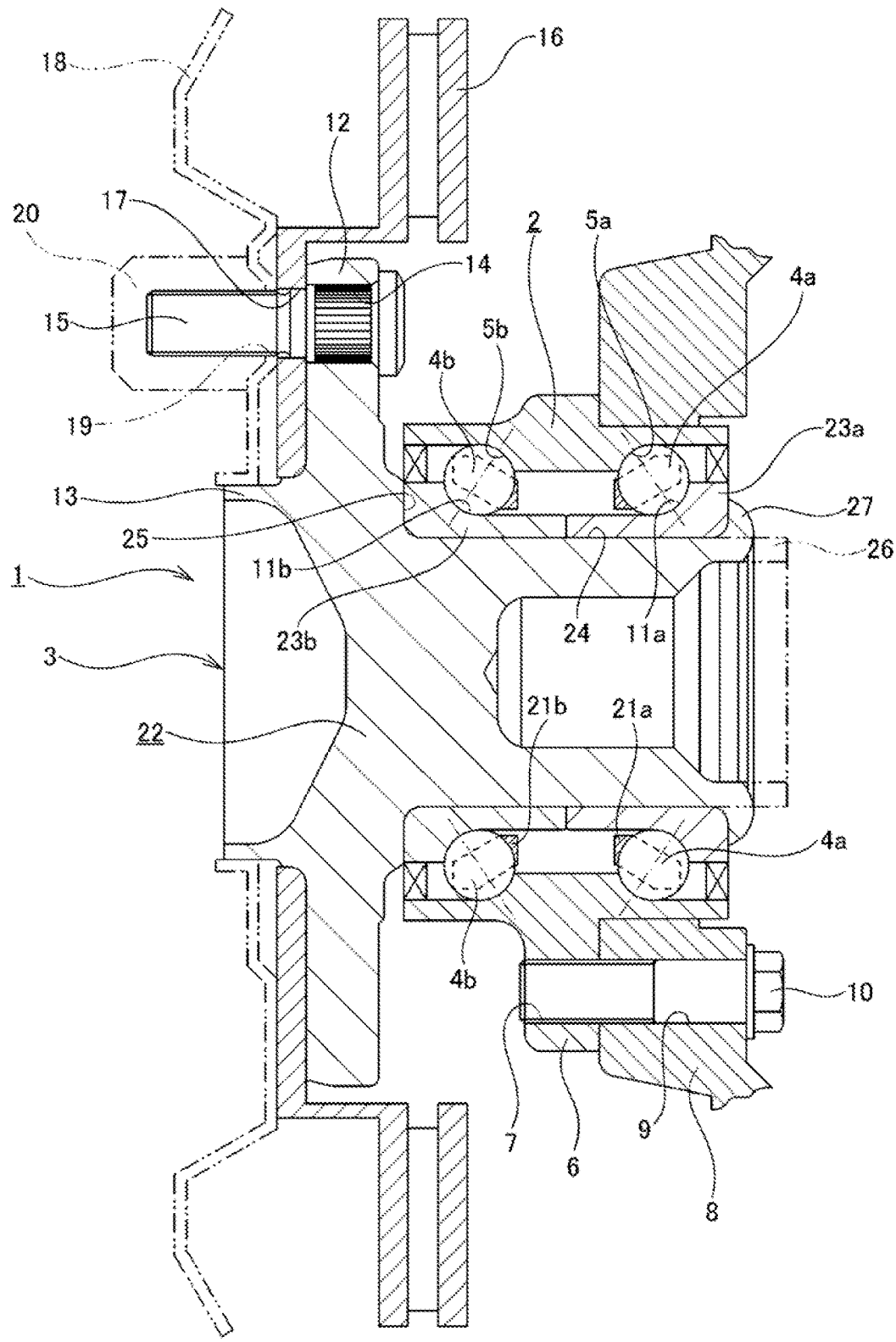
FIG. 1 is a cross-sectional view showing a state in which a bearing unit (a hub unit bearing) is assembled to a vehicle.

As shown in FIG. 1, a hub unit bearing 1 includes an outer ring 2 which has double-row outer ring races 5a and 5b on an inner peripheral surface thereof and is a stationary ring, a hub 3 which has double-row inner ring races 11a and 11b on an outer peripheral surface thereof and is a rotating ring, and a plurality of rolling elements 4a and 4b disposed between the double-row outer ring races 5a and 5b and the double-row inner ring races 11a and 11b for each row. The hub 3 includes a hub ring 22 which corresponds to a first hub element and an inner side inner ring 23a which has an inner ring race 11a on one side in an axial direction of the double-row inner ring races 11a and 11b on an outer peripheral surface thereof and corresponds to a second hub element. The inner side inner ring 23a is externally fitted to the hub ring 22, and a side surface of the inner side inner ring 23a on one side in the axial direction is held down by a staking portion 27 provided at an end portion of the hub ring 22 on one side in the axial direction. Hereinafter, a structure of such a hub unit bearing 1 will be described more specifically.

Regarding the hub unit bearing 1, an outer side in the axial direction is a left side in FIG. 1 which is an outer side in a width direction of a vehicle in a state where the hub unit bearing 1 is assembled to the vehicle, and an inner side in the axial direction is a right side in FIG. 1 which is a central side in the width direction of the vehicle in a state where the hub unit bearing 1 is assembled to the vehicle. Further, in the present example, regarding the hub unit bearing 1, the inner side in the axial direction corresponds to one side in the axial direction, and the outer side in the axial direction corresponds to the other side in the axial direction.

The hub unit bearing 1 is for a driven wheel and includes the outer ring 2, the hub 3, and the plurality of rolling elements 4a and 4b. In a case of carrying out the present invention, the hub unit bearing to be produced may be for a drive wheel.

The outer ring 2 is made of a hard metal such as medium carbon steel and includes the double-row outer ring races 5a and 5b and a stationary flange 6. The double-row outer ring races 5a and 5b are provided on an inner peripheral surface of the axially intermediate portion of the outer ring 2 over the entire circumference. The stationary flange 6 protrudes from the axially intermediate portion of the outer ring 2 toward an outer side in a radial direction. The stationary flange 6 has support holes 7 at a plurality of locations in a circumferential direction.

When a bolt 10 inserted into a through hole 9 of a knuckle 8 constituting a suspension apparatus of the vehicle is screwed and fastened into each of the support holes 7 of the stationary flange 6 from the inner side in the axial direction, the outer ring 2 is supported and fixed to the knuckle 8.

The hub 3 is disposed coaxially with the outer ring 2 on an inner side of the outer ring 2 in the radial direction and includes the double-row inner ring races 11a and 11b, a rotation flange 12, and a pilot portion 13. The double-row inner ring races 11a and 11b are provided on a portion of the outer peripheral surface of the hub 3 facing the double-row outer ring races 5a and 5b over the entire circumference. The rotation flange 12 protrudes from a portion of the hub 3 located at an outer side in the axial direction with respect to the outer ring 2 toward the outer side in the radial direction. The rotation flange 12 has attachment holes 14 at a plurality of locations in the circumferential direction. The pilot portion 13 is provided at an end portion of the hub 3 on the outer side in the axial direction and is formed in a cylindrical shape centered on a central axis of the hub 3.

In the illustrated example, a stud 15 is press-fitted into each of the attachment holes 14 from the inner side in the axial direction. In a state in which the pilot portion 13 is inserted into a central hole provided in a central portion of a rotation body 16 for braking such as a disk or a drum and a wheel 18 which is a wheel of the vehicle and the stud 15 is inserted into each of through holes 17 and 19 provided at a plurality of locations of radially intermediate portions of the rotation body 16 and the wheel 18 in the circumferential direction, a nut 20 is screwed onto a tip end portion of the stud 15, and thus the rotation body 16 and the wheel 18 are coupled to the rotation flange 12.

The attachment hole of the rotation flange may be formed as a screw hole. In this case, a hub bolt which is inserted through the through hole 17 provided in the rotating body 16 for braking and the through hole 19 provided in the wheel 18 is screwed into the attachment hole of the rotation flange, and thus the rotation body 16 for braking and the wheel 18 are coupled and fixed to the rotation flange.

In a case where the hub unit bearing is for a drive wheel, a spline hole penetrating the hub in the axial direction is generally provided in a central portion of the hub. A tip end portion of a drive shaft which is rotationally driven by an engine, an electric motor, or the like as a drive source is spline-engaged with the spline hole. When an automobile is running, the hub is rotationally driven by the drive shaft to rotationally drive the wheels and the rotation body for braking which are coupled and fixed to the rotation flange of the hub.

The rolling elements 4a and 4b are each made of a hard metal such as bearing steel or ceramics, and a plurality of the rolling elements 4a and 4b are disposed between the double-row outer ring races 5a and 5b and the double-row inner ring races 11a and 11b for each row. The rolling elements 4a and 4b are rotatably held by retainers 21a and 21b for each row. In the illustrated example, balls are used as the rolling elements 4a and 4b, but conical rollers may also be used.

In the present example, the hub 3 includes the hub ring 22 made of a hard metal such as medium carbon steel, and an inner side inner ring 23a and an outer side inner ring 23b each made of a hard metal such as bearing steel. The inner ring race 11a on the inner side in the axial direction is provided on an outer peripheral surface of the inner side inner ring 23a. The inner ring race 11b on the outer side in the axial direction is provided on an outer peripheral surface of the outer side inner ring 23b. The rotation flange 12 and the pilot portion 13 are provided in an axially outer side portion of the hub ring 22. The hub ring 22 has a cylindrical fitting surface portion 24 on an outer peripheral surface of an intermediate portion in the axial direction and has a stepped surface 25 facing the inner side in the axial direction at an axially outer side end portion of the fitting surface portion 24. The inner side inner ring 23a and the outer side inner ring 23b are externally fitted to the fitting surface portion 24 of the hub ring 22 by interference fitting (press fitting). Further, the hub ring 22 has the staking portion 27 at an axially inner side end portion. The staking portion 27 is bent toward the outer side in the radial direction from the axially inner side end portion of a portion of the hub ring 22 to which the inner side inner ring 23a is externally fitted and holds down an axially inner side surface of the inner side inner ring 23a. That is, the inner side inner ring 23a and the outer side inner ring 23b are coupled and fixed to the hub ring 22 while interposed between the stepped surface 25 of the hub ring 22 and the staking portion 27 in the axial direction. In this state, a preload is applied to the rolling elements 4a and 4b together with a contact angle of a back surface combination type. The outer side inner ring 23b may be integrally formed with the hub ring 22.

The staking portion 27 is formed by plastically deforming a cylindrical portion 26 extending inward in the axial direction from the axially inner side end portion of a portion of the hub ring 22 before the formation of the staking portion 27 to which the inner side inner ring 23a is externally fitted, as will be described later.

Producing Method of Hub Unit Bearing 1

As shown in FIG. 3, a producing method of the hub unit bearing 1 of the present example includes a first step, a second step, a third step, and a fourth step. Numerical processes in these steps can be performed using a computer.

First Step

The first step is a step of measuring (actually measuring) a plurality of control factors relating to specifications and/or production conditions of the hub unit bearing 1 and torque of the hub unit bearing 1 under two load conditions while producing a plurality of (for example, 1,000, 5,000, 10,000, or the like) hub unit bearings 1 for sale under predetermined specifications and production conditions. The predetermined specifications and production conditions are set in consideration of the performance required for the hub unit bearing 1 or the like. In the first step, for example, measurement of the control factors and the torque, management of measured values, or the like can be performed using a computer. The numerical values in the explanation are examples, and the present invention is not limited to these.

In the present example, each of the hub unit bearings 1 is produced in the following procedure.

First, parts constituting the hub unit bearing 1, specifically, the outer ring 2, the hub ring 22 before the formation of the staking portion 27, the inner side inner ring 23a, the outer side inner ring 23b, the rolling elements 4a and 4b, the retainers 21a and 21b, and the like, are manufactured.

Then, using these parts, for example, the hub unit bearing 1 is assembled in the following procedure. First, the rolling element 4a in an axially inner side row is disposed on an inner diameter side of the outer ring race 5a of the outer ring 2 on the inner side in the axial direction in a state in which the rolling element 4a is held by the retainer 21a on the inner side in the axial direction, and the rolling element 4b in an axially outer side row is disposed on an inner diameter side of the outer ring race 5b of the outer ring 2 on the outer side in the axial direction in a state in which the rolling element 4b is held by the retainer 21b on the outer side in the axial direction. Next, the inner side inner ring 23a is inserted into the inner diameter side of the outer ring 2 from the inner side in the axial direction and the outer side inner ring 23b is inserted into the inner diameter side of the outer ring 2 from the outer side in the axial direction. Next, the inner side inner ring 23a and the outer side inner ring 23b are externally fitted to the fitting surface portion 24 of the hub ring 22 before the formation of the staking portion 27 in a state where axial side surfaces facing each other are in contact with each other, and the axially outer side surface of the outer side inner ring 23b is brought into contact with the stepped surface 25 of the hub ring 22, and thus the hub unit bearing 1 before the formation of the staking portion 27 is assembled. An assembly order of the hub unit bearing 1 before the formation of the staking portion 27 can be appropriately changed as long as there is no contradiction.

Next, the staking portion 27 is formed by plastically processing the cylindrical portion 26 provided at the axially inner side end portion of the hub ring 22 constituting the hub unit bearing 1 before the formation of the staking portion 27.

In the present example, a swaging apparatus 28 as shown in parts (a) and (b) of FIG. 2 is used to form the staking portion 27. In other words, the staking portion 27 is formed by subjecting the cylindrical portion 26 to swaging processing using the swaging apparatus 28. The swaging apparatus 28 includes a support base 29, an outer ring driving means 30, a press die 31, and a press die driving means 32.

The support base 29 has its central axis aligned with a reference axis α which is a virtual axis in a vertical direction set in the swaging apparatus 28. The support base 29 can support the hub 3 on an upper surface thereof in a state where the axially outer side portion of the hub 3 is directed toward a lower side and the central axis of the hub 3 is aligned with the reference axis α.

The outer ring driving means 30 can rotationally drive the outer ring 2 with respect to the hub 3 using an outer ring rotation drive source such as an electric motor. Further, the outer ring driving means 30 can measure rotational resistance of the outer ring 2 with respect to the hub 3, that is, the torque (the rotational torque) of the hub unit bearing 1 on the basis of a current value of the outer ring rotation drive source.

The press die 31 is disposed above the support base 29. The press die 31 has a rotation axis β inclined by an angle θ with respect to the reference axis α and is supported to freely rotate about the rotation axis β. The press die 31 has a processing surface portion 33 at a lower end portion. The processing surface portion 33 is constituted by an inner surface of an annular recess centered on the rotation axis β.

The press die driving means 32 can move the press die 31 up and down along the reference shaft α using a hydraulic mechanism and can rotationally drive the press die 31 around the reference axis α using a press die rotation drive source such as an electric motor. The press die driving means 32 can measure drive torque of the press die 31 centered on the reference axis α on the basis of a current value of the press die rotation drive source. Further, the press die driving means 32 can measure a position in a vertical direction of the press die 31 using a displacement sensor.

When the staking portion 27 is formed by subjecting the cylindrical portion 26 to the swaging processing using the swaging apparatus 28, first, as shown in part (a) of FIG. 2, the hub 3 is supported on the upper surface of the support base 29 in a state where the axially outer side end portion of the hub unit bearing 1 before the formation of the staking portion 27 is directed toward a lower side and the central axis of the hub 3 is aligned with the reference axis α. Next, the outer ring driving means 30 rotationally drives the outer ring 2 with respect to the hub 3, and the press die driving means 32 rotationally drives the pressing die 31 about the reference axis α. Then, in this state, the press die driving means 32 lowers the press die 31 and presses a part of the processing surface portion 33 of the press die 31 in the circumferential direction against a part of the cylindrical portion 26 of the hub ring 22 in the circumferential direction. As a result, a processing force is applied from a part of the processing surface portion 33 of the press die 31 in the circumferential direction to a part of the cylindrical portion 26 in the circumferential direction toward a lower side in the vertical direction (the outer side in the axial direction) and toward an outer side in the radial direction. Further, a position where this processing force is applied is continuously changed in the circumferential direction of the cylindrical portion 26 with the rotation of the press die 31 about the reference axis α. As a result, as shown in part (b) of FIG. 2, the cylindrical portion 26 is plastically deformed to be expanded toward the outer side in the radial direction while being crushed in the axial direction and to form the staking portion 27.

The producing method includes a step of measuring torque of a first hub unit bearing (a first bearing unit) under each of a plurality of load conditions during production of the first hub unit bearing; a step of determining a target value of each of a plurality of control factors (a plurality of production parameters) on the basis of a load-torque relationship obtained from measurement results of the torque; and a step of producing a second hub unit bearing (a second bearing unit) on the basis of the target value of each of the plurality of control factors. In one example, the measurement step includes measuring a plurality of parameter values relating to the plurality of control factors during production of the first hub unit bearing, and the determination step includes setting a level (a reference level) relating to some control factors (production parameters) selected from among the plurality of control factors (production parameters) on the basis of measurement results of the torque and measurement results of the plurality of parameter values, and determining a target value of each of the plurality of control factors using the reference level.

In the present example, a plurality of (for example, about 30 to 50) control factors (parameter values relating to the control factors) relating to the specifications and/or production conditions of the hub unit bearing 1 and torque of the hub unit bearing 1 under two load conditions are measured while the hub unit bearing 1 is produced as described above.

For example, the number of the load conditions can be 2, 3, 4, 5, 6, 7, 8, 9, 10, 20, 30, 40, 50, or more.

The control factors relating to the specifications of the hub unit bearing 1 include, for example, dimensions of the parts constituting the hub unit bearing 1 (the outer ring 2, the hub ring 22 before the formation of the staking portion 27, the inner side inner ring 23a, the outer side inner ring 23b, the rolling elements 4a and 4b, the retainers 21a and 21b, and the like), pitch circle diameters of the rolling elements 4a and 4b, a width between the rows, an axial internal clearance of an intermediary body of the hub unit bearing 1 (an assembly of the outer ring 2, the inner side inner ring 23a, the outer side inner ring 24a, and the rolling elements 4a and 4b and the retainers 21a and 21b for each row), the torque (the starting torque and the rotational torque) of the hub unit bearing 1 before the formation of the staking portion 27, and the like.

Further, the control factors relating to the production conditions of the hub unit bearing 1 include, for example, processing conditions of the parts constituting the hub unit bearing 1 (a spindle rotation speed of a cutting device, a grinding device, or the like), a press fitting load at the time when the inner side inner ring 23a and the outer side inner ring 23b are externally fitted to the fitting surface portion 24 of the hub ring 22, processing conditions of the staking portion 27 (for example, the position in the vertical direction of the press die 31 at the start of processing of the staking portion 27 and drive torque of the press die 31 in a stage of forming the staking portion 27), and the like.

Further, in the present example, torque TA and torque TB are employed as the torque of the hub unit bearing 1 under the above two load conditions.

The torque TA is torque (rotational torque) of the hub unit bearing 1 under a condition in which a load for forming the staking portion 27 is applied in a stage of forming the staking portion 27 by the swaging processing. In the present example, the condition in which a load for forming the staking portion 27 is applied in a stage of forming the staking portion 27 by the swaging processing is specifically a condition in which an eccentric load (moment) applied from the press die 31 is applied when the processing of the caulking portion 27 ends. The torque TA is measured by using the outer ring driving means 30. The eccentric load (the moment) applied from the press die 31 when the torque TA is measured can be considered as a noise condition in which the load condition at the time when the hub unit bearing 1 is used is simulated.

The torque TB is torque (rotational torque) of the hub unit bearing 1 under a condition in which no load is applied in a stage after the staking portion 27 is formed by the swaging processing, specifically, in an inspection step after the hub unit bearing 1 is assembled. This torque TB is measured using a torque measuring device for inspection. In order to stabilize the torque of the hub unit bearing 1, the torque of the hub unit bearing 1 measured under a condition in which a small thrust load and/or a radial load of, for example, about 100 N is applied can be used as the torque TB. In this case, the thrust load and/or the radial load can be considered as the noise condition different from the case of the torque TA.

Second Step

The second step is a step of selecting a predetermined number of control factors (eight control factors A to H in the present example) which are some of a plurality of control factors (some production parameters) from among the plurality of (for example, about 30 to 50) control factors relating to the specifications and/or the production conditions of the hub unit bearing 1 measured in the first step by the method of quality engineering. In the second step, an arithmetic process or the like for selecting the control factors A to H by a regression analysis as will be described below can be performed using a computer. The regression analysis is performed on the basis of measurement results of the torque and measurement results of parameter values relating to the plurality of control factors.

Specifically, in the second step, the eight control factors A to H are selected from among the plurality of (for example, about 30 to 50) control factors measured in the first step in order from a control factor having a high relationship with the torque of the hub unit bearing 1 on the basis of the regression analysis performed using the plurality of (for example, about 30 to 50) control factors (the parameter values relating to the control factors) and the torque (TA and TB) of the hub unit bearing under the two load conditions measured in the first step.

More specifically, the SN ratio is calculated based on the measurement results of the torque. First, for each of the plurality of (for example, 1,000, 5,000, 10,000, or the like) hub unit bearings 1 produced in the first step, the SN ratio $[=-10 \cdot \log((TA^2+TB^2)/2)]$ is calculated from the torque TA and TB measured in the first step. The SN ratio means that the larger the value, the smaller the change in torque due to the change in load conditions relating to the hub unit bearing 1. Further, in the present example, the SN ratio is calculated based on smaller-the-best characteristics of quality engineering. However, the SN ratio can also be calculated based on nominal-the-best characteristics of quality engineering.

Next, a relationship between each of the plurality of (for example, about 30 to 50) control factors (parameter values) measured in the first step and the SN ratio is confirmed. That is, since each of the plurality of (for example, about 30 to 50) control factors (parameter values) measured in the first step varies due to an unavoidable manufacturing error, the relationship between each of the plurality of (for example, 30 to 50) control factors (parameter values) measured in the first step and the SN ratio can be confirmed. Then, for each of these relationships, a simple regression line is obtained.

Then, the some production parameters are selected from among the plurality of control factors (the plurality of production parameters) on the basis of calculation results of the SN ratio. For example, the eight control factors are selected from among the plurality of (for example, about 30 to 50) control factors measured in the first step in order from a control factor having a high relationship with the torque of the hub unit bearing 1, that is, in order from a control factor having a large inclination of the simple regression line. Then, the eight control factors selected in this way are designated as the control factors A to H.

In a case where the present invention is carried out, selection of a predetermined number of the control factors in the second step can be automatically performed by a computer, can be performed by a human only on the basis of his/her own judgment, or can be performed by a human with reference to results of a computer.

Third Step

The third step is a step of obtaining a level to reduce a change in torque due to a change in load conditions relating to the completed hub unit bearing from a range of a distribution of values of each of the eight control factors A to H using the eight control factors A to H selected in the second step and the torque (TA and TB) of the hub unit bearing under the two load conditions measured in the first step by the method of quality engineering.

The third step includes a level determination step (S1), an allocation step (S2), a pattern-based SN ratio calculation step (S3), a level-based SN ratio calculation step (S4), and an optimum level selection step (S5), each of which is one step of the method of quality engineering.

Hereinafter, these steps (S1 to S5) will be sequentially described. In the third step, an arithmetic process or the like in these steps (S1 to S5) can be performed using a computer.

Level Determination Step (S1)

The level determination step (S1) is a step of determining a level of each of the control factors A to H (in the present example, A1, A2, B1 to B3, C1 to C3, D1 to D3, E1 to E3, F1 to F3, G1 to G3, H1 to H3) within the range of the distribution of the values of each of the control factors A to H measured in the first step.

That is, in the present example, in the optimum level selection step (S5) which will be described later, a level to reduce a change in torque due to a change in load conditions relating to the hub unit bearing 1 is obtained from the range of the distributions of the values of the control factors A to H measured in the first step. For this purpose, first, in the level determination step (S1), a level of each of the control factors A to H is determined within the range of the distribution of the values of each of the control factors A to H measured in the first step.

To explain the level determination step (S1) more specifically, part (a) of FIG. 4 illustrates the distribution of the values of the control factor A (for example, the axial internal clearance of the intermediary body of the hub unit bearing 1) measured in the first step. That is, a target value of the control factor A is set before the start of production of a plurality of (P: for example, 1,000, 5,000, 10,000, or the like) hub unit bearings 1 in the first step, but a distribution (a variation) occurs in the measured values (x1 to xP) on the basis of the unavoidable manufacturing error. In the present example, the control factor A is divided into two levels A1 and A2 as a reference within the range of the distribution of the values (the parameter values) of the control factor A. It is preferable that the two levels A1 and A2 be separated from each other to some extent. For this purpose, in the present example, a standard deviation $\sigma$ is calculated from the distribution of the values of the control factor A by the following equation (1).

[Equation 1]

$$\sigma = \sqrt{\frac{1}{n}\sum_{i=1}^{P}(xi - xa)^2} \quad (1)$$

In the equation (1), xa is an average value of x1 to xP. Then, the levels A1 and A2 are set to have values separated from each other by $\sigma$ or more. Specifically, the level A1 is set to $-\sigma/2$ or less, and the level A2 is set to $\sigma/2$ or more. However, in a case where the present invention is carried out, it is possible to employ an interval between the levels A1 and A2 different from that in the present example.

Part (b) of FIG. 4 illustrates the distribution of the values of the control factor B measured in the first step. A target value of the control factor B is also set before the start of production of the hub unit bearing 1, but a distribution (a variation) occurs in the measured values on the basis of the unavoidable manufacturing error. In the present example, the control factor B is divided into three levels B1, B2, and B3 as a reference within the range of the distribution of the values of the control factor B. It is preferable that the three levels B1, B2, and B3 be separated from each other to some extent. For this purpose, in the present example, a standard deviation $\sigma$ is calculated from the distribution of the values of the control factor B, and the levels B1, B2, and B3 have values causing them to be separated from each other by $\sigma$ or more. Specifically, the level B1 is set to $-\sigma/2$ or less, the level B2 is set to $-\sigma/2$ or more and $\sigma/2$ or less, and the level B3 is set to $3\sigma/2$ or more. However, in a case where the present invention is carried out, it is possible to employ an interval between the levels B1, B2, and B3 different from that in the present example.

Each of the remaining control factors C to H is also divided into three levels (C1 to C3, D1 to D3, E1 to E3, F1 to F3, G1 to G3, or H1 to H3) as a reference as in the control factor B.

Even in a case where the distribution of the values of each of the control factors A to H does not become a normal distribution, the level of each of the control factors A to H can be determined using the standard deviation $\sigma$ as described above.

Allocation Step (S2)

The allocation step (S2) is a step of allocating the level of each of the control factors A to H determined in the level determination step (S1) to an orthogonal table (in the present example, an L18 orthogonal table) as shown in Table 1 below.

TABLE 1

| PATTERN NO. | CONTROL FACTOR A | CONTROL FACTOR B | CONTROL FACTOR C | CONTROL FACTOR D | CONTROL FACTOR E | CONTROL FACTOR F | CONTROL FACTOR G | CONTROL FACTOR H |
|---|---|---|---|---|---|---|---|---|
| 1 | A1 | B1 | C1 | D1 | E1 | F1 | G1 | H1 |
| 2 | A1 | B1 | C2 | D2 | E2 | F2 | G2 | H2 |
| 3 | A1 | B1 | C3 | D3 | E3 | F3 | G3 | H3 |
| 4 | A1 | B2 | C1 | D1 | E2 | F2 | G3 | H3 |
| 5 | A1 | B2 | C2 | D2 | E3 | F3 | G1 | H1 |
| 6 | A1 | B2 | C3 | D3 | E1 | F1 | G2 | H2 |
| 7 | A1 | B3 | C1 | D2 | E1 | F3 | G2 | H3 |
| 8 | A1 | B3 | C2 | D3 | E2 | F1 | G3 | H1 |
| 9 | A1 | B3 | C3 | D1 | E3 | F2 | G1 | H2 |
| 10 | A2 | B1 | C1 | D3 | E3 | F2 | G2 | H1 |
| 11 | A2 | B1 | C2 | D1 | E1 | F3 | G3 | H2 |
| 12 | A2 | B1 | C3 | D2 | E2 | F1 | G1 | H3 |
| 13 | A2 | B2 | C1 | D2 | E3 | F1 | G3 | H2 |
| 14 | A2 | B2 | C2 | D3 | E1 | F2 | G1 | H3 |
| 15 | A2 | B2 | C3 | D1 | E2 | F3 | G2 | H1 |
| 16 | A2 | B3 | C1 | D3 | E2 | F3 | G1 | H2 |

TABLE 1-continued

| | | | | | | | | |
|---|---|---|---|---|---|---|---|---|
| 17 | A2 | B3 | C2 | D1 | E3 | F1 | G2 | H3 |
| 18 | A2 | B3 | C3 | D2 | E1 | F2 | G3 | H1 |

| PATTERN NO. | TA | TB | TA | TB | TA | TB | TA | TB | TA | TB | SN RATIO |
|---|---|---|---|---|---|---|---|---|---|---|---|
| 1 | TA11 | TB11 | TA12 | TB12 | TA13 | TB13 | | | | | SN1 |
| 2 | TA21 | TB21 | TA22 | TB22 | TA23 | TB23 | TA24 | TB24 | | | SN2 |
| 3 | TA31 | TB31 | TA32 | TB32 | | | | | | | SN3 |
| 4 | TA41 | TB41 | TA42 | TB42 | TA43 | TB43 | | | | | SN4 |
| 5 | TA51 | TB51 | TA52 | TB52 | TA53 | TB53 | TA54 | TB54 | TA55 | TB55 | SN5 |
| 6 | TA61 | TB61 | TA62 | TB62 | | | | | | | SN6 |
| 7 | TA71 | TB71 | | | | | | | | | SN7 |
| 8 | TA81 | TB81 | TA82 | TB82 | TA83 | TB83 | | | | | SN8 |
| 9 | TA91 | TB91 | TA92 | TB92 | TA93 | TB93 | TA94 | TB94 | | | SN9 |
| 10 | TA101 | TB101 | TA102 | TB102 | | | | | | | SN10 |
| 11 | TA111 | TB111 | | | | | | | | | SN11 |
| 12 | TA121 | TB121 | TA122 | TB122 | | | | | | | SN12 |
| 13 | TA131 | TB131 | | | | | | | | | SN13 |
| 14 | TA141 | TB141 | TA142 | TB142 | | | | | | | SN14 |
| 15 | TA151 | TB151 | TA152 | TB152 | TA153 | TB153 | | | | | SN15 |
| 16 | TA161 | TB161 | | | | | | | | | SN16 |
| 17 | TA171 | TB171 | TA172 | TB172 | TA173 | TB173 | | | | | SN17 |
| 18 | TA181 | TB181 | TA182 | TB182 | TA183 | TB183 | TA184 | TB184 | | | SN18 |

Pattern-Based SN Ratio Calculation Step (S3)

The pattern-based SN ratio calculation step (S3) is a step of calculating the SN ratio for each of 18 patterns (pattern numbers 1 to 18) which are described in Table 1 (the orthogonal table) and are each constituted by a combination of the levels of the control factors A to H using the torque (TA and TB) of the hub unit bearing 1 measured in the first step. The SN ratio means that the larger the value, the smaller the change in torque due to the change in load conditions relating to the hub unit bearing 1.

To explain the pattern-based SN ratio calculation step (S3) more specifically, it is assumed that for example, a pattern constituted by a combination of the levels of the control factors A to H of an Nth-produced hub unit bearing 1 among the plurality of hub unit bearings 1 produced under the predetermined specifications and production conditions is (A1, B3, C2, D3, E2, F1, G3, H1). Since this pattern is the same as a pattern number 8 in Table 1 (the orthogonal table), as shown in Table 1 (the orthogonal table), the torque (TA=TA81, TB=TB81) of the Nth-produced hub unit bearing 1 is recorded in a field of the torque (TA, TB) of the pattern number 8.

Further, for example, assuming that the pattern constituted by a combination of the levels of the control factors A to H of an N+1th produced hub unit bearing 1 is the same as a pattern number 1 in Table 1 (the orthogonal table), as shown in Table 1 (the orthogonal table), the torque (TA=TA11, TB=TB11) of the N+1th produced hub unit bearing 1 is recorded in a field of the torque (TA, TB) of the pattern number 1.

As described above, if there is the same combination of the levels as any one pattern number of Table 1 (the orthogonal table) among the plurality of hub unit bearings 1 produced under the predetermined specifications and production conditions, the torque (TA, TB) of the hub unit bearing 1 is recorded in the field of the torque (TA, TB) of the pattern number one by one. As a result, as shown in Table 1 (the orthogonal table), the torque (TA, TB) of at least one hub unit bearing 1 is recorded in the field of the torque (TA, TB) of each of all pattern numbers 1 to 18. In Table 1 (the orthogonal table), (TA11, TB11) is the torque recorded first for the pattern number 1, (TA12, TB12) is the torque recorded second for the pattern number 1, and (TA13, TB13) is the torque recorded third for the pattern number 1. The same applies to the torque recorded in other pattern numbers.

Next, the SN ratio (each of SN1 to SN18) for each of the pattern numbers 1 to 18 is calculated from the torque recorded in the field of the torque (TA, TB) for each of the pattern numbers 1 to 18 in Table 1 (the orthogonal table) and is recorded in a field of the SN ratio of Table 1 (the orthogonal table). In the present example, an SN ratio (SNn) of a pattern number n (n: 1 to 18) is obtained by performing calculations of the following equations (2) to (6).

[Equation 2]
$$STAn = \sum_{k=1}^{m}(TAnk)^2 \quad (2)$$

[Equation 3]
$$STBn = \sum_{k=1}^{m}(TBnk)^2 \quad (3)$$

[Equation 4]
$$STn = STAn + STBn \quad (4)$$

[Equation 5]
$$V = (STn)/2m \quad (5)$$

[Equation 6]
$$SNn = -10 \cdot \log V \quad (6)$$

In the equations (2), (3), and (5), m is the number of data of the torque TA and the number of data of the torque TB recorded for the pattern number n in Table 1 (the orthogonal table).

As a specific example, an SN ratio (SN8) of a pattern number 8 is obtained by performing the following calculations. The number of data m of the torque TA (the torque TB) of the pattern number 8 is 3.

$$STA8=(TA81)^2+(TA82)^2+(TA83)^2$$

$$STB8=(TB81)^2+(TB82)^2+(TB83)^2$$

$$ST8=STA8+STB8$$

$$V=(ST8)/6$$

$$SN8=-10\cdot\log V$$

Level-Based SN Ratio Calculation Step (S4)

The level-based SN ratio calculation step (S4) is a step of calculating the SN ratio for each of the levels (A1, A2, B1 to B3, C1 to C3, D1 to D3, E1 to E3, F1 to F3, G1 to G3, and H1 to H3) of the control factors A to H using the SN ratio (each of SN1 to SN18) for each of the pattern numbers 1 to 18 calculated in the pattern-based SN ratio calculation step (S3).

In the present example, the SN ratio of the level $\lambda t$ (t: 1 to 2 at the level A and 1 to 3 at the levels B to H) of the control factor $\lambda$ ($\lambda$: A to H) is an average value of the SN ratios of the pattern numbers including the level $\lambda t$ among the pattern numbers 1 to 18 in Table 1 (the orthogonal table).

As a specific example, the SN ratio of the level A1 of the control factor A is obtained by performing the following calculation.

SN ratio of level $A1=(SN1+SN2+SN3+SN4+SN5+SN6+SN7+SN8+SN9)/9$

The SN ratios of other levels (A2, B1 to B3, C1 to C3, D1 to D3, E1 to E3, F1 to F3, G1 to G3, and H1 to H3) are also obtained by performing the same calculation. Then, the SN ratio for each level obtained in this way is recorded in an auxiliary table as shown in Table 2 below.

TABLE 2

| | | LEVEL | | |
|---|---|---|---|---|
| | | 1 | 2 | 3 |
| CONTROL | A | A1 | A2 | |
| FACTOR | B | B1 | B2 | B3 |
| | C | C1 | C2 | C3 |
| | D | D1 | D2 | D3 |
| | E | E1 | E2 | E3 |
| | F | F1 | F2 | F3 |
| | G | G1 | G2 | G3 |
| | H | H1 | H2 | H3 |

Optimum Level Selection Step (S5)

The optimum level selection step (S5) is a step of selecting (obtaining) a level to reduce the change in torque due to a change in load conditions relating to the hub unit bearing 1, that is, a level to increase the SN ratio from the levels of each of the control factors A to H using the SN ratio for each level of the control factors A to H calculated in the level-based SN ratio calculation step (S4).

To explain the optimum level selection step (S5) more specifically, first, a factor-effect diagram as illustrated in FIG. 5 is created from the SN ratio for each level of the control factors A to H. Then, the control factors and levels to increase the SN ratio are selected as circled in this factor-effect diagram. That is, in the illustrated example, the control factors C, D, E, and F are selected as the control factors to increase the SN ratio. Further, for the control factor C, a level C3 is selected as the level to increase the SN ratio, for the control factor D, a level D3 is selected as the level to increase the SN ratio, for the control factor E, a level E1 is selected as the level to increase the SN ratio, and for the control factor F, a level F3 is selected as the level to increase the SN ratio.

Table 3 below is a table in which the SN ratio of each of a combination (current) in which the levels of all the control factors A to H are 2 as a combination of the levels of the current and a combination (optimum) of optimum levels in which some of the combination of the levels of the current is replaced with the levels (C3, D3, E1, and F3) of the factors selected in the factor-effect diagram of FIG. 5 is obtained and shown. In Table 3, the SN ratio of the current represents an average value of the SN ratios of each of the levels of the current, that is, a value obtained by dividing the total of A2, B2, C2, D2, E2, F2, G2, and H2 in Table 2 by 8, and the SN ratio of the optimum represents an average value of the SN ratios of each of the levels of the optimum, that is, a value obtained by dividing the total of A2, B2, C3, D3, E1, F3, G2, and H2 in Table 2 by 8. A gain in Table 3 represents a difference between the SN ratio of the current and the SN ratio of the optimum. In Table 3, the level of the control factor A of the current is A2. However, the control factor A has two levels and there is no medium, either A1 or A2 may be the level of the current, that is, A1 may be used as the level of the current rather than A2.

TABLE 3

| CURRENT | A2 | B2 | C2 | D2 | E2 | F2 | G2 | H2 | SN RATIO (CURRENT) |
|---|---|---|---|---|---|---|---|---|---|
| OPTIMUM | A2 | B2 | C3 | D3 | E1 | F3 | G2 | H2 | SN RATIO (OPTIMUM) |
| | | | GAIN | | | | | | SN RATIO (DIFFERENCE) |

Reproduction Experiment in Third Step

Next, from among the plurality of hub unit bearings 1 produced in the first step, a hub unit bearing 1 having the combination of the levels of the current in Table 3 is found, and the SN ratio $[=-10\cdot\log((TA^2+TB^2)/2)]$ is calculated from the torque (TA, TB). Then, it is confirmed that the SN ratio thus obtained is almost the same as the SN ratio of the current in Table 3. Further, from among the plurality of hub unit bearings 1 produced in the first step, a hub unit bearing 1 having the combination of the levels of the optimum in Table 3 is found, and the SN ratio $[=-10\cdot\log((TA^2+TB^2)/2)]$ is calculated from the torque (TA, TB). Then, it is confirmed that the SN ratio thus obtained is almost the same as the SN ratio of the optimum in Table 3. In the third step, the above confirmation process can also be performed using a computer.

Fourth Step

In the fourth step, the value of the level of the control factor obtained in the third step is set as the target value of the control factor, and a plurality of (for example, 1,000, 5,000, 10,000, or the like) other hub unit bearings 1 for sale are produced.

Specifically, if the above confirmation is possible in a reproduction experiment in the third step, that is, if the reliability of the combination of the optimum level in Table 3 can be confirmed, the target values of the control factors C, D, E, and F among the control factors relating to the predetermined specifications and production conditions are changed to the values of the levels (C3, D3, E1, and F3) of the optimum, and a plurality of (for example, 1,000, 5,000, 10,000, or the like) other hub unit bearings 1 for sale to be produced from these are produced.

As a result, the change in torque due to the change in load conditions relating to the plurality of other hub unit bearings 1 to be produced in the fourth step is reduced as compared with the change in torque due to the change in load conditions relating to the plurality of hub unit bearings 1 produced in the first step.

Further, in a case where the present invention is carried out, if the processes of the first step to the third step described above are repeated, the change in torque due to the change in load conditions relating to the hub unit bearing 1 is stepwise reduced up to the lower limit saturation value. In other words, the strength of the hub unit bearing 1 against disturbance can be stepwise improved while the hub unit bearing 1 for sale is produced.

As described above, in the producing method of a hub unit bearing of the present example, the torque TA and TB of the hub unit bearing 1 is measured under two load conditions while a plurality of hub unit bearings 1 are produced, the target value to reduce the change in torque due to the change in load conditions relating to the hub unit bearing 1 for the control factors relating to the specifications and/or the production conditions of the hub unit bearing 1 is obtained on the basis of the torque TA and TB measured under the two load conditions, and the plurality of other hub unit bearings 1 are produced on the basis of the target value of the control factors. Therefore, the torque measured at the time of production of the hub unit bearing 1 can be effectively used to reduce the change in torque due to the change in load conditions relating to any other hub unit bearing to be produced.

Second Embodiment

A second embodiment of the present invention will be described with reference to FIGS. 6 to 9.

Also in the second embodiment, as in the first embodiment, in the optimum level selection step (S5) of the third step, after the factor-effect diagram shown in FIG. 5 is created, from among the plurality of hub unit bearings 1 produced under the predetermined specifications and production conditions, a hub unit bearing 1 having the combination of the levels of the current and a hub unit bearing 1 having the combination of the levels of the optimum are found, and each SN ratio (the measured value) is calculated from each torque (TA, TB). After that, in the present embodiment, a more optimum level of the control factor is obtained by performing additional experiments. That is, the producing method further includes a step of measuring torque of a second hub unit bearing (a second bearing unit) in each of a plurality of load conditions during production of the second hub unit bearing based on a target value of each of a plurality of control factors (a plurality of production parameters) according to a reference level determined on the basis of measurement results during production of a first hub unit bearing (a first bearing unit). The producing method further includes a step of measuring torque of a third hub unit bearing (a third bearing unit) under each of the plurality of load conditions during production of the third hub unit bearing based on a target value of each of the plurality of control factors according to a level different from the reference level. The producing method further includes a step of determining a revised target value of each of the plurality of control factors on the basis of a load-torque relationship based on the production of the second hub unit bearing and a load-torque relationship based on the production of the third hub unit bearing; and a step of producing a fourth hub unit bearing (a bearing unit) on the basis of the revised target value of each of the plurality of control factors. This example will be specifically described below. The process of the numerical value when the level of such a more optimum control factor is obtained can also be performed using a computer.

FIG. 6 is the same factor-effect diagram as FIG. 5, but in the present example, for each of the control factors C, D, E, and F, levels C3', D3', E1', and F3' deviated from the levels C3, D3, E1, and F3 selected in the optimum level selection step (S5) to a side opposite to a side of the center (C2, D2, E2, F2) of the distribution (a side where the SN ratio is likely to be larger and a side indicated by an arrow in FIG. 6) slightly (in the present example, by a standard deviation σ or more) are determined. Specifically, for the control factor C, the level C3' which is slightly larger than the level C3 (a standard deviation σ or more) is determined. Specifically, for the control factor D, the level D3' which is slightly larger than the level D3 (a standard deviation σ or more) is determined. Specifically, for the control factor E, the level E1' which is slightly smaller than the level E1 (a standard deviation σ or more) is determined. Specifically, for the control factor F, the level F3' which is slightly larger than the level F3 (a standard deviation σ or more) is determined.

Then, an experiment in which a predetermined number (for example, about 30) of hub unit bearings 1 are produced with the values of the determined levels C3', D3', E1', and F3' set as the target values (the center of the distribution) is conducted, and the torque (TA, TB) is measured for each of the hub unit bearings 1. Then, the SN ratio (the measured value) is obtained from the measured torque (TA, TB), and Table 4 below is created. In Table 4, optimum 1 is a hub unit bearing in which some of the combination of the levels of the optimum are replaced with the levels C3', D3', E1', and F3' among the predetermined number of hub unit bearings 1 produced by the experiment. It is confirmed whether or not the SN ratio of the optimum 1 thus obtained is higher than the SN ratio of the optimum (see FIG. 9).

TABLE 4

| CURRENT | A2 | B2 | C2 | D2 | E2 | F2 | G2 | H2 | SN RATIO (MEASURED VALUE) |
|---|---|---|---|---|---|---|---|---|---|
| OPTIMUM | A2 | B2 | C3 | D3 | E1 | F3 | G2 | H2 | SN RATIO (MEASURED VALUE) |
| OPTIMUM 1 | A2 | B2 | C3' | D3' | E1' | F3' | G2 | H2 | SN RATIO (MEASURED VALUE) |

In this confirmation work, it can be confirmed that the SN ratio of the optimum 1 is higher than the SN ratio of the optimum, that is, in the combination of the optimum 1, the change in torque due to the change in load conditions relating to the hub unit bearing 1 is reduced as compared with in the combination of the levels of the optimum. In this case, it is confirmed whether the actual production of the hub unit bearing 1 can be performed with the combination of the levels of the optimum 1. Then, if this confirmation is possible, the target values of the control factors C, D, E, and F among the control factors (including the control factors A to H) relating to the predetermined specifications and production conditions are changed to the values of the levels (C3', D3', E1', and F3') of the optimum 1, and a plurality of (for example, 1,000, 5,000, 10,000, or the like) other hub unit bearings 1 for sale to be produced from these are produced. As a result, the change in torque due to the change in the load conditions relating to the plurality of other hub unit bearings can be reduced as compared with in the case of the first embodiment.

Further, in a case where the present invention is carried out, the work of obtaining the level of the control factor to reduce the change in torque due to the change in load conditions on the basis of the above performed experiment can also be repeated until a level at which the change in torque due to the change in load conditions becomes the lower limit saturation value (the SN ratio is saturated) is obtained.

To explain this point with a specific example, for example, as described above, it is confirmed that the SN ratio of the optimum 1 is higher than the SN ratio of the optimum (see FIG. 9). In this case, a level having a higher SN ratio than the original levels C3, D3, E1, and F3 is confirmed among the levels C3', D3', E1', and F3'. In this confirmation work, for example, it is confirmed that all of the levels C3', D3', E1', and F3' have a higher SN ratio than the original levels C3, D3, E1, and F3. In this case, for the control factors C, D, E, and F, levels C3", D3", E1", and F3" deviated from the levels C3, D3, E1, and F3 selected in the optimum level selection step (S5) to a side opposite to a side of the center (C2, D2, E2, F2) of the distribution (a side indicated by an arrow in FIG. 6) significantly as compared with the levels C3', D3', E1', and F3' are determined. Specifically, for example, as shown in the distributions in parts (a) to (d) of FIG. 7, the levels C3", D3", E1", and F3" deviated (to a side indicated by an arrow in FIG. 6) by the standard deviation σ or more as compared with the levels C3', D3', E1', and F3' are determined. Then, an experiment in which a predetermined number (for example, about 30) of hub unit bearings 1 are produced with the values of the determined levels C3", D3", E1", and F3" set as the target values (the center of the distribution) is conducted, and the torque (TA, TB) is measured for each of the hub unit bearings 1. Then, the SN ratio (the measured value) is obtained from the measured torque (TA, TB), and Table 5 below is created. In Table 5, optimum 2 is a hub unit bearing in which some of the combination of the levels of the optimum 1 are replaced with the levels C3", D3", E1", and F3" among the predetermined number of hub unit bearings 1 produced by the experiment. It is confirmed whether or not the SN ratio of the optimum 2 thus obtained is higher than the SN ratio of the optimum 1 (see FIG. 9).

TABLE 5

| | | | | | | | | | |
|---|---|---|---|---|---|---|---|---|---|
| CURRENT | A2 | B2 | C2 | D2 | E2 | F2 | G2 | H2 | SN RATIO (MEASURED VALUE) |
| OPTIMUM | A2 | B2 | C3 | D3 | E1 | F3 | G2 | H2 | SN RATIO (MEASURED VALUE) |
| OPTIMUM 1 | A2 | B2 | C3' | D3' | E1' | F3' | G2 | H2 | SN RATIO (MEASURED VALUE) |
| OPTIMUM 2 | A2 | B2 | C3" | D3" | E1" | F3" | G2 | H2 | SN RATIO (MEASURED VALUE) |

In this confirmation work, it can be confirmed that the SN ratio of the optimum 2 is higher than the SN ratio of the optimum 1. In this case, a level having a higher SN ratio than the original levels C3', D3', E1', and F3' is confirmed among the levels C3", D3", E1", and F3". In this confirmation work, for example, it is confirmed that only the levels C3" and E1" have a higher SN ratio than the original levels C3' and E1'. In this case, for the control factors C and E, levels C3'" and E1'" deviated from the levels C3 and E1 selected in the optimum level selection step (S5) to a side opposite to a side of the center (C2, D2, E2, F2) of the distribution (a side indicated by an arrow in FIG. 6) significantly as compared with the levels C3" and E1" are determined. Specifically, for example, as shown in parts (a) and (b) of FIG. 8, the levels C3'" and E1'" deviated (to a side indicated by an arrow in FIG. 6) by the standard deviation σ or more as compared with the levels C3" and E1" are determined. Then, an experiment in which a predetermined number (for example, about 30) of hub unit bearings 1 are produced with the values of the determined levels C3'" and E1'" set as the target values (the center of the distribution) is conducted, and the torque (TA, TB) is measured for each of the hub unit bearings 1. Then, the SN ratio (the measured value) is obtained from the measured torque (TA, TB), and Table 6 below is created. In Table 6, optimum 3 is a hub unit bearing in which some of the combination of the levels of the optimum 2 are replaced with the levels C3'" and E1'" among the predetermined number of hub unit bearings 1 produced by the experiment. It is confirmed whether or not the SN ratio of the optimum 3 thus obtained is higher than the SN ratio of the optimum 2 (see FIG. 9).

TABLE 6

| CURRENT | A2 | B2 | C2 | D2 | E2 | F2 | G2 | H2 | SN RATIO (MEASURED VALUE) |
|---|---|---|---|---|---|---|---|---|---|
| OPTIMUM | A2 | B2 | C3 | D3 | E1 | F3 | G2 | H2 | SN RATIO (MEASURED VALUE) |
| OPTIMUM 1 | A2 | B2 | C3' | D3' | E1' | F3' | G2 | H2 | SN RATIO (MEASURED VALUE) |
| OPTIMUM 2 | A2 | B2 | C3" | D3" | E1" | F3" | G2 | H2 | SN RATIO (MEASURED VALUE) |
| OPTIMUM 3 | A2 | B2 | C1''' | D3" | E1''' | F3" | G2 | H2 | SN RATIO (MEASURED VALUE) |

In this confirmation work, it is confirmed that the SN ratio of the optimum 3 is hardly higher than the SN ratio of the optimum 2, that is, the SN ratio of the optimum 3 is almost the same as the SN ratio of the optimum 2 (the SN ratio is saturated). In this case, at that time, the experiment of producing a predetermined number of hub unit bearings 1 as described above is completed.

Then, it is confirmed whether the actual hub unit bearing 1 can be produced with the combination of the levels at which the SN ratio is saturated (in the above-mentioned example, the combination of the levels of the optimum 2 or the optimum 3). Then, if this confirmation is possible, the target values of the control factors C, D, E, and F among the control factors (including the control factors A to H) relating to the predetermined specifications and production conditions are changed to the values of the levels at which the SN ratio is saturated (in the above-mentioned example, the levels of the optimum 2 or the optimum 3), and a plurality of (for example, 1,000, 5,000, 10,000, or the like) other hub unit bearings 1 for sale to be produced from these are produced. As a result, the change in torque due to the change in the load conditions relating to the plurality of other hub unit bearings can be more reduced. Other configurations and effects are the same as in the first embodiment.

In a case where the present invention is carried out, the number of the control factors used in the method of quality engineering is not limited to the eight adopted in each of the above-described embodiments and may be seven or less or nine or more.

The technical scope of the present invention is not limited to the scope described in the embodiments. Various changes or improvements can be made to the embodiments. Forms with such changes or improvements may also be included in the technical scope of the present invention. Further, the present invention is not limited to the described embodiments, and any combination of these configurations may be used.

In one embodiment, the bearing unit that is the subject of the producing method is a hub unit bearing for supporting the wheels of the vehicle against the suspension apparatus.

In a first aspect of the embodiment, in a producing method of a hub unit bearing, the torque of the hub unit bearing is measured under two load conditions while a plurality of the hub unit bearings are produced, the target value to reduce the change in torque due to the change in load conditions relating to the hub unit bearing for the control factors relating to the specifications and/or the production conditions of the hub unit bearing is obtained on the basis of the torque measured under the two load conditions, and the plurality of other hub unit bearings are produced on the basis of the target value of the control factors.

In a second aspect of the embodiment, a producing method of a hub unit bearing includes:
 a first step of measuring a plurality of control factors relating to the specifications and/or production conditions of the hub unit bearing and torque of the hub unit bearing under two load conditions while a plurality of the hub unit bearings are produced;
 a second step of selecting a predetermined number of control factors which are some of the plurality of control factors from the plurality of control factors measured in the first step;
 a third step of obtaining a level to reduce a change in torque due to a change in load conditions relating to the hub unit bearing from a range of a distribution of values of each of the predetermined number of control factors using the predetermined number of control factors selected in the second step and the torque of the hub unit bearing under the two load conditions measured in the first step; and
 a fourth step of producing a plurality of other hub unit bearings with the value of the level of the control factor obtained in the third step set as the target value of the control factor.

In a third aspect of the embodiment, a producing method of a hub unit bearing includes:
 a first step of measuring a plurality of control factors relating to the specifications and/or production conditions of the hub unit bearing and torque of the hub unit bearing under two load conditions while a plurality of the hub unit bearings are produced;
 a second step of selecting a predetermined number of control factors which are some of the plurality of control factors from the plurality of control factors measured in the first step;
 a third step of obtaining a level to reduce a change in torque due to a change in load conditions relating to the hub unit bearing from a range of a distribution of values of each of the predetermined number of control factors using the predetermined number of control factors selected in the second step and the torque of the hub unit bearing under the two load conditions measured in the first step and then obtaining a level of the control factor to reduce the change in the torque due to the change in the load conditions on the basis of experiment performed to produce a plurality of hub unit bearings with a value of a level deviated from the obtained level of the control factor to a side opposite to a central side of the distribution set as the target value of the control factor; and a fourth step of producing a plurality of other hub unit bearings with the value of the level of the control factor obtained in the third step set as the target value of the control factor.

In the producing method of a hub unit bearing of the third aspect, in the third step, the work of obtaining the level of the control factor to reduce the change in torque due to the change in the load conditions on the basis of the above performed experiment can be repeated until a level at which the change in torque due to the change in the load conditions becomes the lower limit saturation value is obtained.

In the producing method of a hub unit bearing of the second aspect and the third aspect, in the second step, the predetermined number of control factors can be selected from among the plurality of control factors measured in the first step in order from a control factor having a high relationship with the torque of the hub unit bearing on the basis of the regression analysis performed using the plurality of control factors and the torque of the hub unit bearing under the two load conditions measured in the first step.

In the producing method of a hub unit bearing of the second aspect and the third aspect, in the third step, as a step for obtaining a level to reduce a change in torque due to a change in load conditions relating to the hub unit bearing from a range of a distribution of values of each of the predetermined number of control factors using the predetermined number of control factors selected in the second step and the torque of the hub unit bearing under the two load conditions measured in the first step, a level determination step,
an allocation step,
a pattern-based SN ratio calculation step,
a level-based SN ratio calculation step, and
an optimum level selection step can be provided.

In the level determination step, the level of each of the control factors is determined within the range of the distribution of the values of each of the predetermined number of control factors.

In the allocation step, the level of each of the control factors determined in the level determination step is allocated to an orthogonal table.

In the pattern-based SN ratio calculation step, the SN ratio for each pattern constituted by a combination of the levels of the control factors is calculated using the torque of the hub unit bearing measured under the two load conditions.

In the level-based SN ratio calculation step, the SN ratio for each level of the control factors is calculated using the SN ratio for each pattern calculated in the pattern-based SN ratio calculation step.

In the optimum level selection step, a level to reduce the change in torque due to a change in load conditions relating to the hub unit bearing is selected from the levels of each of the control factors using the SN ratio for each level of the control factors calculated in the level-based SN ratio calculation step.

For example, in the producing method of a hub unit bearing of the embodiment, the hub unit bearing has an outer ring which has double-row outer ring races on an inner peripheral surface thereof and is a stationary ring, a hub which has double-row inner ring races on an outer peripheral surface thereof and is a rotating ring, and a plurality of rolling elements disposed between the double-row outer ring races and the double-row inner ring races for each row. The hub includes a first hub element and a second hub element which has an inner ring race on one side in an axial direction of the double-row inner ring races on an outer peripheral surface thereof. The second hub element is externally fitted to the first hub element, and a side surface of the second hub element on one side in the axial direction is held down by a staking portion provided at an end portion of the first hub element on one side in the axial direction.

As the configuration of such a hub unit bearing, for example, a configuration in which the inner ring race of the double-row inner ring races on the other side in the axial direction is provided on the outer peripheral surface of the first hub element, or a configuration in which the inner ring race of the double-row inner ring races on the other side in the axial direction is provided on the outer peripheral surface of another hub element externally fitted to the first hub element can be employed.

For example, one load condition of the two load conditions is a condition in which a load for forming the staking portion is applied in a stage of forming the staking portion by the swaging processing, and the other load condition of the two load conditions is a condition in which no load is applied or a condition in which a thrust load and/or a radial load is applied in a stage after the staking portion is formed.

In the example in FIG. 1, balls are used as the rolling elements 4a and 4b, but instead of these, as shown in FIG. 10, conical rollers can be used.

FIG. 11 is a partial schematic view of a vehicle 200 including a hub unit bearing (a bearing unit) 151. The present invention can be applied to both a hub unit bearing for a drive wheel and a hub unit bearing for a driven wheel. In FIG. 11, the hub unit bearing 151 is for a drive wheel and includes an outer ring 152, a hub 153, and a plurality of rolling elements 154. The outer ring 152 is fixed to a knuckle 201 of a suspension apparatus using a bolt or the like. A wheel (and a rotating body for braking) 202 is fixed to a flange (a rotation flange) 153A provided in the hub 153 using a bolt or the like. Further, the vehicle 200 can have the same support structure as that described above for the hub unit bearing 151 for a driven wheel.

The bearing unit can be applied to, for example, bearings 900A and 900B and the like that support a rotating shaft 963 of a motor 961 shown in FIG. 12.

In FIG. 12, the motor 961 is a brushless motor and has a cylindrical center housing 965 and a substantially disk-shaped front housing 967 that closes one opening end portion of the center housing 965. The rotatable rotating shaft 963 is supported inside the center housing 965 along the axis thereof via the bearings 900A and 900B each disposed at the front housing 967 and a bottom of the center housing 965. A rotor 969 for driving a motor is provided around the rotating shaft 963, and a stator 971 is fixed to an inner peripheral surface of the center housing 965.

Generally, the motor 961 is mounted on a machine or a vehicle and rotationally drives the rotating shaft 963 supported by the bearings 900A and 900B.

The bearing unit can be applied to a rotation support portion of a machine having a rotating portion, various manufacturing apparatus, for example, a screw apparatus such as a ball screw apparatus, and a linear motion apparatus such as an actuator (combination of a linear motion guide bearing and a ball screw, an XY table, and the like). Further, the bearing unit can be applied to a wiper, a power window, an electric door, an electric seat, and steering apparatuses such as a steering column (for example, an electric tilt telescopic steering column), a universal joint, an intermediate gear, a rack and pinion, an electric power steering apparatus, and a worm speed reducer. Further, the bearing unit can be applied to various vehicles such as an automobile, a motorcycle, and a train. The bearing unit having the present configuration can be suitably applied to any location where a relative rotation occurs, which can lead to improvement in product quality and cost reduction.

As a bearing unit or a bearing included in the bearing unit, various types of bearings such as rolling bearings and sliding bearings can be suitably applied. For example, a bearing can be applied to an outer ring and an inner ring of a radial rolling bearing, an outer ring and an inner ring of a radial cylindrical roller bearing using a cylindrical roller (including a needle), and an outer ring and an inner ring of a radial conical roller bearing using a conical roller.

REFERENCE SIGNS LIST

1 Hub unit bearing (bearing unit)
2 Outer ring
3 Hub
4a, 4b Rolling element
5a, 5b Outer ring race
6 Stationary flange
7 Support hole
8 Knuckle
9 Through hole
10 Bolt
11a, 11b Inner ring race
12 Rotation flange
13 Pilot portion
14 Attachment hole
15 Stud
16 Rotation body for braking
17 Through hole
18 Wheel
19 Through hole
20 Nut
21a, 21b Retainer
22 Hub ring
23a Inner side inner ring
23b Outer side inner ring
24 Fitting surface portion
25 Stepped surface
26 Cylindrical portion
27 Staking portion
28 Swaging apparatus
29 Support base
30 Outer ring driving means
31 Press die
32 Press die driving means
33 Processing surface portion

The invention claimed is:

1. A bearing unit producing method comprising:
a step of measuring torque of a first bearing unit under each of a plurality of load conditions during production of the first bearing unit;
a step of determining a target value of each of a plurality of production parameters based on a load-torque relationship obtained from the measurement results of the torque; and
a step of producing a second bearing unit based on the target value of each of the plurality of production parameters,
wherein the measurement step includes measuring a plurality of parameter values relating to the plurality of production parameters during production of the first bearing unit, and
wherein the determination step includes
setting a reference level relating to certain production parameters selected from among the plurality of production parameters based on the measurement results of the torque and the measurement results of the plurality of parameter values, and
determining a target value of each of the plurality of production parameters using the reference level,
wherein the determination step further includes calculating an SN ratio based on measurement results of the torque, and
wherein the certain production parameters are selected from among the plurality of production parameters based on calculation results of the SN ratio.

2. The bearing unit producing method according to claim 1,
wherein the determination step further includes performing a regression analysis based on the measurement results of the torque and the measurement results of the plurality of parameter values.

3. The bearing unit producing method according to claim 1, further comprising:
a step of measuring torque of the second bearing unit under each of the plurality of load conditions during production of the second bearing unit based on the target value of each of the plurality of production parameters according to the reference level;
a step of measuring torque of a third bearing unit under each of the plurality of load conditions during production of the third bearing unit based on a target value of each of the plurality of production parameters according to a level different from the reference level;
a step of determining a revised target value of each of the plurality of production parameters based on a load-torque relationship based on the production of the second bearing unit and a load-torque relationship based on the production of the third bearing unit; and
a step of producing a fourth bearing unit based on the revised target value of each of the plurality of production parameters.

4. A producing method of a machine that includes a bearing unit, comprising a step of producing the bearing unit by the producing method according to claim 1.

5. A producing method of a vehicle that includes a bearing unit, comprising a step of producing the bearing unit by the producing method according to claim 1.

* * * * *